US011900955B2

(12) United States Patent
Fueg et al.

(10) Patent No.: US 11,900,955 B2
(45) Date of Patent: *Feb. 13, 2024

(54) APPARATUS AND METHOD FOR SCREEN RELATED AUDIO OBJECT REMAPPING

(71) Applicant: Fraunhofer-Gesellschaft zur Foerderung der angewandten Forschung e.V., Munich (DE)

(72) Inventors: Simone Fueg, Kalchreuth (DE); Jan Plogsties, Fuerth (DE); Sascha Dick, Nuremberg (DE); Johannes Hilpert, Nuremberg (DE); Julien Robilliard, Nuremberg (DE); Achim Kuntz, Hemhofen (DE); Andreas Hoelzer, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,188

(22) Filed: Nov. 18, 2022

(65) Prior Publication Data

US 2023/0162749 A1 May 25, 2023

Related U.S. Application Data

(63) Continuation of application No. 16/950,768, filed on Nov. 17, 2020, now Pat. No. 11,527,254, which is a
(Continued)

(30) Foreign Application Priority Data

Mar. 26, 2014 (EP) ..................... 14161819
Dec. 8, 2014 (EP) ..................... 14196769

(51) Int. Cl.
*G10L 19/20* (2013.01)
*H04S 7/00* (2006.01)
(Continued)

(52) U.S. Cl.
CPC ............ *G10L 19/20* (2013.01); *G10L 19/008* (2013.01); *H04N 21/233* (2013.01);
(Continued)

(58) Field of Classification Search
CPC ........ H04R 5/02; H04R 3/12; H04N 21/8106; H04N 21/4516; H04N 21/233;
(Continued)

(56) References Cited

U.S. PATENT DOCUMENTS 7,606,372 B2 10/2009 Melchior et al.
9,179,236 B2 * 11/2015 Robinson ................ H04S 7/308
(Continued)

FOREIGN PATENT DOCUMENTS

CN 102099854 A 6/2011
CN 102460571 A 5/2012
(Continued)

OTHER PUBLICATIONS

Neuendorf, Max, et al., "The ISO/MPEG Unified Speech and Audio Coding Standard Consistent High Quality for all Content Types and at all Bit Rates", J. Audio Eng. Soc., vol. 61, No. 12, pp. 956-977.
(Continued)

*Primary Examiner* — Yosef K Laekemariam
(74) *Attorney, Agent, or Firm* — Perkins Coie LLP; Michael A. Glenn

(57) ABSTRACT

An apparatus for generating loudspeaker signals includes an object metadata processor configured to receive metadata, to calculate a second position of the audio object depending on the first position of the audio object and on a size of a screen if the audio object is indicated in the metadata as being
(Continued)

screen-related, to feed the first position of the audio object as the position information into the object renderer if the audio object is indicated in the metadata as being not screen-related, and to feed the second position of the audio object as the position information into the object renderer if the audio object is indicated in the metadata as being screen-related. The apparatus further includes an object renderer configured to receive an audio object and to generate the loudspeaker signals depending on the audio object and on position information.

15 Claims, 17 Drawing Sheets

Related U.S. Application Data continuation of application No. 16/236,079, filed on Dec. 28, 2018, now Pat. No. 10,854,213, which is a continuation of application No. 15/274,310, filed on Sep. 23, 2016, now Pat. No. 10,192,563, which is a continuation of application No. PCT/EP2015/056417, filed on Mar. 25, 2015.

(51) Int. Cl.
| | | |
|---|---|---|
| *G10L 19/008* | (2013.01) | |
| *H04N 21/233* | (2011.01) | |
| *H04N 21/431* | (2011.01) | |
| *H04N 21/45* | (2011.01) | |
| *H04N 21/84* | (2011.01) | |
| *H04N 21/439* | (2011.01) | |
| *H04N 21/81* | (2011.01) | |
| *H04S 3/00* | (2006.01) | |
| *G10L 19/16* | (2013.01) | |

(52) U.S. Cl.
CPC ....... *H04N 21/439* (2013.01); *H04N 21/4318* (2013.01); *H04N 21/4516* (2013.01); *H04N 21/8106* (2013.01); *H04N 21/84* (2013.01); *H04S 3/008* (2013.01); *H04S 7/00* (2013.01); *H04S 7/30* (2013.01); *H04S 7/308* (2013.01); *G10L 19/167* (2013.01); *H04S 2400/11* (2013.01)

(58) Field of Classification Search
CPC ...... H04N 21/431; H04N 21/45; H04N 21/84; G10L 19/20; G10L 19/008; H04S 7/00
USPC ..... 381/17, 23, 55, 58, 59, 77, 89, 111, 303, 381/302
See application file for complete search history.

(56) References Cited

U.S. PATENT DOCUMENTS

| | | | |
|---|---|---|---|
| 9,451,363 B2 * | 9/2016 | Jax | H04S 7/302 |
| 10,299,062 B2 | 5/2019 | Jax et al. | |
| 10,504,527 B2 | 12/2019 | Herre et al. | |
| 2003/0007648 A1 | 1/2003 | Currell | |
| 2005/0147257 A1 | 7/2005 | Melchior et al. | |
| 2006/0294125 A1 | 12/2006 | Deaven et al. | |
| 2010/0017002 A1 | 1/2010 | Oh et al. | |
| 2012/0078642 A1 | 3/2012 | Seo et al. | |
| 2012/0183162 A1 | 7/2012 | Chabanne et al. | |
| 2013/0202129 A1 | 8/2013 | Kraemer et al. | |
| 2013/0216070 A1 | 8/2013 | Keiler et al. | |
| 2013/0236033 A1 | 9/2013 | Ayres et al. | |
| 2013/0236039 A1 | 9/2013 | Jax et al. | |
| 2014/0016785 A1 | 1/2014 | Neuendorf et al. | |
| 2014/0016786 A1 | 1/2014 | Sen et al. | |
| 2014/0019146 A1 | 1/2014 | Neuendorf et al. | |
| 2014/0023196 A1 | 1/2014 | Xiang et al. | |
| 2014/0023197 A1 | 1/2014 | Xiang et al. | |
| 2014/0133683 A1 | 5/2014 | Robinson et al. | |

FOREIGN PATENT DOCUMENTS

| | | |
|---|---|---|
| CN | 102667919 A | 9/2012 |
| CN | 103250207 A | 8/2013 |
| CN | 103313182 A | 9/2013 |
| CN | 103650539 A | 3/2014 |
| EP | 1318502 A2 | 6/2003 |
| EP | 2637427 A1 | 9/2013 |
| EP | 2637428 A1 | 9/2013 |
| JP | 2009278381 A | 11/2009 |
| JP | 2013521725 A | 6/2013 |
| JP | 2013187903 A | 9/2013 |
| JP | 2013187908 A | 9/2013 |
| JP | 6422995 B2 | 10/2018 |
| TW | 201325269 A | 6/2013 |
| WO | 2004073352 A1 | 8/2004 |
| WO | 2013006330 A2 | 1/2013 |
| WO | 2013006338 A2 | 1/2013 |
| WO | 2014032709 A1 | 3/2014 |

OTHER PUBLICATIONS

Schultz-Amling, et al., "Acoustical Zooming Based on a Parametric Sound Field Representation", AES Convention Paper 8120; Presented at the 128th Convention; London, UK, May 22-25, 2010, 9 pages.

* cited by examiner

APPARATUS AND METHOD FOR SCREEN RELATED AUDIO OBJECT REMAPPING

CROSS-REFERENCE TO RELATED APPLICATIONS

This application is a continuation of U.S. patent application Ser. No. 16/950,768, filed Nov. 17, 2020, which is a continuation of copending U.S. patent application Ser. No. 16/236,079, filed Dec. 28, 2018, now U.S. Pat. No. 10,854, 213, issued on Dec. 1, 2020, which is a continuation of U.S. patent application Ser. No. 15/274,310, filed Sep. 23, 2016, now U.S. Pat. No. 10,192,563, issued on Jan. 29, 2019, which is a continuation of International Application No. PCT/EP2015/056417, filed Mar. 25, 2015, which are incorporated herein by reference in their entirety, and additionally claims priority from European Applications Nos. EP 14161819.9, filed Mar. 26, 2014, and EP 14196769.5, filed Dec. 8, 2014, both of which are incorporated herein by reference in their entirety.

The present invention relates to audio signal processing, in particular, to an apparatus and a method for audio object remapping, and, more particularly, to an apparatus and a method for screen related audio object remapping.

BACKGROUND OF THE INVENTION

With increasing multimedia content consumption in daily life, the demand for sophisticated multimedia solutions steadily increases. In this context, the integration of visual and audio content plays an important role. An optimal adjustment of visual and audio multimedia content to the available visual and audio replay setup would be desirable.

In the state of the art, audio objects are known. Audio objects may, e.g., be considered as sound tracks with associated metadata. The metadata may, e.g., describe the characteristics of the raw audio data, e.g., the desired playback position or the volume level. An advantage of object-based audio is that a predefined movement can be reproduced by a special rendering process on the playback side in the best way possible for all reproduction loudspeaker layouts.

Geometric metadata can be used to define where an audio object should be rendered, e.g., angles in azimuth or elevation or absolute positions relative to a reference point, e.g., the listener. The metadata is stored or transmitted along with the object audio signals.

In the context of MPEG-H, at the 105th MPEG meeting the audio group reviewed the requirements and timelines of different application standards (MPEG=Moving Picture Experts Group). According to that review, it would be essential to meet certain points in time and specific requirements for a next generation broadcast system. According to that, a system should be able to accept audio objects at the encoder input. Moreover, the system should support signaling, delivery and rendering of audio objects and should enable user control of objects, e.g., for dialog enhancement, alternative language tracks and audio description language.

In the state of the art, different concepts are provided. According to a first conventional technology, presented in "*Method and apparatus for playback of a higher-order ambisonics audio signal*" (see [1]), the playback of spatial sound field-oriented audio to its linked visible objects is adapted by applying space warping processing. In that conventional technology, the decoder warps the sound field such that all sound objects in the direction of the screen are compressed or stretched according to the ratio of the sizes of the target and reference screens. A possibility is included to encode and transmit the reference size (or the viewing angle from a reference listening position) of the screen used in the content production as metadata together with the content. Alternatively, a fixed reference screen size is assumed in encoding and for decoding, and the decoder knows the actual size of the target screen. In this conventional technology, the decoder warps the sound field in such a manner that all sound objects in the direction of the screen are compressed or stretched according to the ratio of the size of the target screen and the size of the reference screen. So-called "two-segment piecewise linear" warping functions are used. The stretching is limited to the angular positions of sound items. In that conventional technology, for centered screens the definition of the warping function is similar to the definition of the mapping function for screen-related remapping. The first and the third segment of the three-segment piecewise linear mapping function the mapping function could be defined as a two-segment piecewise linear function. However, with that conventional technology, the application is limited to HOA (HOA=higher order ambisonics) (sound field-oriented) signals in space domain. Moreover, the warping function is only dependent on ratio of reference screen and reproduction screen, no definition for non-centered screens is provided.

In another conventional technology, "*Vorrichtung and Verfahren zum Bestimmen einer Wiedergabeposition*" (see [2]), a method to adapt the position of a sound source to the video reproduction is described. The playback position of the sound source is determined individually for each sound object in dependence of direction and distance to the reference point and of camera parameters. That conventional technology also describes a screen with a fixed reference size is assumed. A linear scaling of all position parameters (in Cartesian coordinates) is conducted for adapting the scene to a reproduction screen that is larger or smaller than the reference screen. However, according to that prior art, the incorporation of physical camera and projection parameters is complex, and such parameters are not always available. Moreover, the method of that conventional technology works in Cartesian coordinates (x,y,z), so not just the position but also the distance of an object changes with scene scaling. Furthermore, this conventional technology is not applicable for an adaption of the object's position with respect to changes of relative screen size (aperture angle, viewing angle) in angular coordinates.

In a further conventional technology, "*Verfahren zur Audiocodierung*" (see [3]), a method is described which includes a transmission of the current (time-varying) horizontal and vertical viewing angle in the data stream (reference viewing angle, in relation to the listener's position in the original scene). On the reproduction side, the size and position of the reproduction are analyzed and the playback of the sound objects is individually optimized to match with the reference screen.

In another conventional technology, "*Acoustical Zooming Based on a parametric Sound Field Representation*" (see [4]), a method is described, which provides audio rendering that follows the movement of the visual scene ("Acoustical zoom"). The acoustical zooming process is defined as a shift of the virtual recording position. The scene-model for the zooming algorithm places all sound sources on a circle with an arbitrary but fixed radius. However, the method of that conventional technology works in the DirAC parameter domain, distance and angles (direction of arrival) are changed, the mapping function is non-linear and depends on a zoom factor/parameter and non-centered screens are not supported.

SUMMARY

According to an embodiment, an apparatus for generating loudspeaker signals may have: an object metadata processor, and an object renderer, wherein the object renderer is configured to receive an audio object, wherein the object metadata processor is configured to receive metadata, including an indication on whether the audio object is screen-related, and further including a first position of the audio object, wherein the object metadata processor is configured to calculate a second position of the audio object depending on the first position of the audio object and depending on a size of a screen if the audio object is indicated in the metadata as being screen-related, wherein the object renderer is configured to generate the loudspeaker signals depending on the audio object and depending on position information, wherein the object metadata processor is configured to feed the first position of the audio object as the position information into the object renderer if the audio object is indicated in the metadata as being not screen-related, and wherein the object metadata processor is configured to feed the second position of the audio object as the position information into the object renderer if the audio object is indicated in the metadata as being screen-related.

According to another embodiment, a decoder device may have: a USAC decoder for decoding a bitstream to acquire one or more audio input channels, to acquire one or more input audio objects, to acquire compressed object metadata and to acquire one or more SAOC transport channels, an SAOC decoder for decoding the one or more SAOC transport channels to acquire a first group of one or more rendered audio objects, an apparatus for generating loudspeaker signals, which apparatus may have: an object metadata processor, and an object renderer, wherein the object renderer is configured to receive an audio object, wherein the object metadata processor is configured to receive metadata, including an indication on whether the audio object is screen-related, and further including a first position of the audio object, wherein the object metadata processor is configured to calculate a second position of the audio object depending on the first position of the audio object and depending on a size of a screen if the audio object is indicated in the metadata as being screen-related, wherein the object renderer is configured to generate the loudspeaker signals depending on the audio object and depending on position information, wherein the object metadata processor is configured to feed the first position of the audio object as the position information into the object renderer if the audio object is indicated in the metadata as being not screen-related, and wherein the object metadata processor is configured to feed the second position of the audio object as the position information into the object renderer if the audio object is indicated in the metadata as being screen-related, wherein said apparatus may have: an object metadata decoder, being the object metadata processor of said apparatus, and being implemented for decoding the compressed object metadata to acquire uncompressed metadata, and the object renderer of said apparatus, for rendering the one or more input audio objects depending on the uncompressed metadata to acquire a second group of one or more rendered audio objects, a format converter for converting the one or more audio input channels to acquire one or more converted channels, and a mixer for mixing the one or more audio objects of the first group of one or more rendered audio objects, the one or more audio objects of the second group of one or more rendered audio objects and the one or more converted channels to acquire one or more decoded audio channels.

According to another embodiment, a method for generating loudspeaker signals may have the steps of: receiving an audio object, receiving metadata, including an indication on whether the audio object is screen-related, and further including a first position of the audio object, calculating a second position of the audio object depending on the first position of the audio object and depending on a size of a screen if the audio object is indicated in the metadata as being screen-related, generating the loudspeaker signals depending on the audio object and depending on position information, wherein the position information is the first position of the audio object if the audio object is indicated in the metadata as being not screen-related, and wherein the position information is the second position of the audio object if the audio object is indicated in the metadata as being screen-related.

According to another embodiment, a non-transitory digital storage medium may have a computer program stored thereon to perform the method for generating loudspeaker signals, which method may have the steps of: receiving an audio object, receiving metadata, including an indication on whether the audio object is screen-related, and further including a first position of the audio object, calculating a second position of the audio object depending on the first position of the audio object and depending on a size of a screen if the audio object is indicated in the metadata as being screen-related, generating the loudspeaker signals depending on the audio object and depending on position information, wherein the position information is the first position of the audio object if the audio object is indicated in the metadata as being not screen-related, and wherein the position information is the second position of the audio object if the audio object is indicated in the metadata as being screen-related, when said computer program is run by a computer.

An apparatus for audio object remapping is provided. The apparatus comprises an object metadata processor and an object renderer. The object renderer is configured to receive an audio object. The object metadata processor is configured to receive metadata, comprising an indication on whether the audio object is screen-related, and further comprising a first position of the audio object. Moreover, the object metadata processor is configured to calculate a second position of the audio object depending on the first position of the audio object and depending on a size of a screen if the audio object is indicated in the metadata as being screen-related. The object renderer is configured to generate the loudspeaker signals depending on the audio object and depending on position information. The object metadata processor is configured to feed the first position of the audio object as the position information into the object renderer if the audio object is indicated in the metadata as being not screen-related. Furthermore, the object metadata processor is configured to feed the second position of the audio object as the position information into the object renderer if the audio object is indicated in the metadata as being screen-related.

According to an embodiment, the object metadata processor may, e.g., be configured to not calculate the second position of the audio object if the audio object is indicated in the metadata as being not screen-related.

In an embodiment, the object renderer may, e.g., be configured to not determine whether the position information is the first position of the audio object or the second position of the audio object.

According to an embodiment, the object renderer may, e.g., be configured to generate the loudspeaker signals further depending on the number of the loudspeakers of a playback environment.

In an embodiment, the object renderer may, e.g., be configured to generate the loudspeaker signals further depending on a loudspeaker position of each of the loudspeakers of the playback environment.

According to an embodiment, the object metadata processor is configured to calculate the second position of the audio object depending on the first position of the audio object and depending on the size of the screen if the audio object is indicated in the metadata as being screen-related, wherein the first position indicates the first position in a three-dimensional space, and wherein the second position indicates the second position in the three-dimensional space.

In an embodiment, the object metadata processor may, e.g., be configured to calculate the second position of the audio object depending on the first position of the audio object and depending on the size of the screen if the audio object is indicated in the metadata as being screen-related, wherein the first position indicates a first azimuth, a first elevation and a first distance, and wherein the second position indicates a second azimuth, a second elevation and a second distance.

According to an embodiment, the object metadata processor may, e.g., be configured to receive the metadata, comprising the indication on whether the audio object is screen-related as a first indication, and further comprising a second indication if the audio object is screen-related, said second indication indicating whether the audio object is an on-screen object. The object metadata processor may, e.g., be configured to calculate the second position of the audio object depending on the first position of the audio object and depending on the size of the screen, such that the second position takes a first value on a screen area of the screen if the second indication indicates that the audio object is an on-screen object.

In an embodiment, the object metadata processor may, e.g., be configured to calculate the second position of the audio object depending on the first position of the audio object and depending on the size of the screen, such that the second position takes a second value, which is either on the screen area or not on the screen area if the second indication indicates that the audio object is not an on-screen object.

According to an embodiment, the object metadata processor may, e.g., be configured to receive the metadata, comprising the indication on whether the audio object is screen-related as a first indication, and further comprising a second indication if the audio object is screen-related, said second indication indicating whether the audio object is an on-screen object. The object metadata processor may, e.g., be configured to calculate the second position of the audio object depending on the first position of the audio object, depending on the size of the screen, and depending on a first mapping curve as the mapping curve if the second indication indicates that the audio object is an on-screen object, wherein the first mapping curve defines a mapping of original object positions in a first value interval to remapped object positions in a second value interval. Moreover, the object metadata processor may, e.g., be configured to calculate the second position of the audio object depending on the first position of the audio object, depending on the size of the screen, and depending on a second mapping curve as the mapping curve if the second indication indicates that the audio object is not an on-screen object, wherein the second mapping curve defines a mapping of original object positions in the first value interval to remapped object positions in a third value interval, and wherein said second value interval is comprised by the third value interval, and wherein said second value interval is smaller than said third value interval.

In an embodiment, each of the first value interval and the second value interval and the third value interval may, e.g., be a value interval of azimuth angles, or each of the first value interval and the second value interval and the third value interval may, e.g., be a value interval of elevation angles.

According to an embodiment, the object metadata processor may, e.g., be configured to calculate the second position of the audio object depending on at least one of a first linear mapping function and a second linear mapping function, wherein the first linear mapping function is defined to map a first azimuth value to a second azimuth value, wherein the second linear mapping function is defined to map a first elevation value to a second elevation value, wherein $\varphi_{left}^{nominal}$ indicates a left azimuth screen edge reference, wherein $\varphi_{right}^{nominal}$ indicates a right azimuth screen edge reference, wherein $\theta_{top}^{nominal}$ indicates a top elevation screen edge reference, wherein $\theta_{bottom}^{nominal}$ indicates a bottom elevation screen edge reference, wherein $\varphi_{left}^{repro}$ indicates a left azimuth screen edge of the screen, wherein $\varphi_{right}^{repro}$ indicates a right azimuth screen edge of the screen, wherein $\theta_{top}^{repro}$ indicates a top elevation screen edge of the screen, wherein $\theta_{bottom}^{repro}$ indicates a bottom elevation screen edge of the screen, wherein $\varphi$ indicates the first azimuth value, wherein $\varphi'$ indicates the second azimuth value, wherein $\theta$ indicates the first elevation value, wherein $\theta'$ indicates the second elevation value, wherein the second azimuth value $\varphi'$ may, e.g., result from a first mapping of the first azimuth value $\varphi$ according to the first linear mapping function according to $$\varphi' = \begin{cases} \frac{\varphi_{right}^{repro} + 180°}{\varphi_{right}^{nominal} + 180°} \cdot (\varphi + 180°) - 180° & \text{for } -180° \leq \varphi < \varphi_{right}^{nominal} \\ \frac{\varphi_{left}^{repro} - \varphi_{right}^{repro}}{\varphi_{left}^{nominal} - \varphi_{right}^{nominal}} \cdot (\varphi - \varphi_{right}^{nominal}) + \varphi_{right}^{repro} & \text{for } \varphi_{right}^{nominal} \leq \varphi < \varphi_{left}^{nominal}, \\ \frac{180° - \varphi_{left}^{repro}}{180° - \varphi_{left}^{nominal}} \cdot (\varphi - \varphi_{left}^{nominal}) + \varphi_{left}^{repro} & \text{for } \varphi_{left}^{nominal} \leq \varphi < 180° \end{cases}$$

and wherein the second elevation value $\theta'$ may, e.g., result from a second mapping of the first elevation value $\theta$ according to the second linear mapping function according to $$\theta' = \begin{cases} \frac{\theta_{bottom}^{repro} + 90°}{\theta_{bottom}^{nominal} + 90°} \cdot (\theta + 90°) - 90° & \text{for } -90° \leq \theta < \theta_{bottom}^{nominal} \\ \frac{\theta_{top}^{repro} - \theta_{bottom}^{repro}}{\theta_{top}^{nominal} - \theta_{bottom}^{nominal}} \cdot (\theta - \theta_{bottom}^{nominal}) + \theta_{bottom}^{repro} & \text{for } \theta_{bottom}^{nominal} \leq \theta < \theta_{top}^{nominal} . \\ \frac{90° - \theta_{top}^{repro}}{90° - \theta_{top}^{nominal}} \cdot (\theta - \theta_{top}^{nominal}) + \theta_{top}^{repro} & \text{for } \theta_{top}^{nominal} \leq \theta < 90° \end{cases}$$

Moreover, a decoder device is provided. The decoder device comprises a USAC decoder for decoding a bitstream to obtain one or more audio input channels, to obtain one or more input audio objects, to obtain compressed object metadata and to obtain one or more SAOC transport channels. Furthermore, the decoder device comprises an SAOC decoder for decoding the one or more SAOC transport channels to obtain a first group of one or more rendered audio objects. Moreover, the decoder device comprises an apparatus according to the embodiments described above. The apparatus comprises an object metadata decoder, being the object metadata processor of the apparatus according to the embodiments described above, and being implemented for decoding the compressed object metadata to obtain uncompressed metadata, and the apparatus further comprises the object renderer of the apparatus according to the embodiments described above, for rendering the one or more input audio objects depending on the uncompressed metadata to obtain a second group of one or more rendered audio objects. Furthermore, the decoder device comprises a format converter for converting the one or more audio input channels to obtain one or more converted channels. Moreover, the decoder device comprises a mixer for mixing the one or more audio objects of the first group of one or more rendered audio objects, the one or more audio objects of the second group of one or more rendered audio objects and the one or more converted channels to obtain one or more decoded audio channels.

Furthermore, a method for generating loudspeaker signals is provided. The method comprises:

Receiving an audio object.

Receiving metadata, comprising an indication on whether the audio object is screen-related, and further comprising a first position of the audio object.

Calculating a second position of the audio object depending on the first position of the audio object and depending on a size of a screen if the audio object is indicated in the metadata as being screen-related.

Generating the loudspeaker signals depending on the audio object and depending on position information.

The position information is the first position of the audio object if the audio object is indicated in the metadata as being not screen-related. The position information is the second position of the audio object if the audio object is indicated in the metadata as being screen-related.

Moreover, a computer program is provided, wherein the computer program is configured to implement the above-described method when being executed on a computer or signal processor.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
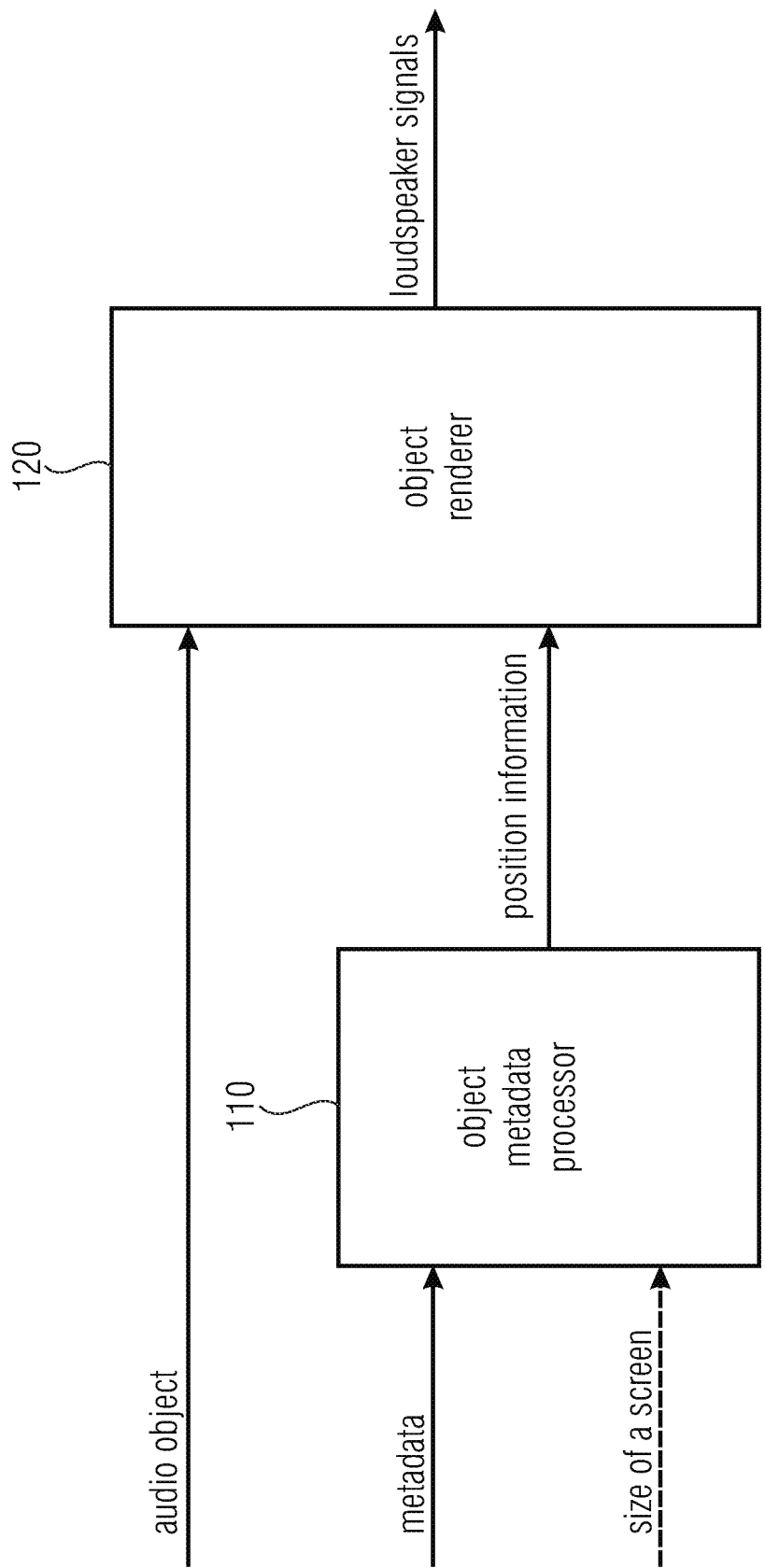
FIG. 1 is an apparatus for generating loudspeaker signals according to an embodiment.

FIG. 1 illustrates an apparatus for audio object remapping according to an embodiment. The apparatus comprises an object metadata processor 110 and an object renderer 120.

The object renderer 120 is configured to receive an audio object.

The object metadata processor 110 is configured to receive metadata, comprising an indication on whether the audio object is screen-related, and further comprising a first position of the audio object. Moreover, the object metadata processor 110 is configured to calculate a second position of the audio object depending on the first position of the audio object and depending on a size of a screen if the audio object is indicated in the metadata as being screen-related.

The object renderer 120 is configured to generate the loudspeaker signals depending on the audio object and depending on position information.

The object metadata processor 110 is configured to feed the first position of the audio object as the position information into the object renderer 120 if the audio object is indicated in the metadata as being not screen-related.

Furthermore, the object metadata processor 110 is configured to feed the second position of the audio object as the position information into the object renderer 120 if the audio object is indicated in the metadata as being screen-related.

According to an embodiment, the object metadata processor 110 may, e.g., be configured to not calculate the second position of the audio object if the audio object is indicated in the metadata as being not screen-related.

In an embodiment, the object renderer 120 may, e.g., be configured to not determine whether the position information is the first position of the audio object or the second position of the audio object.

According to an embodiment, the object renderer 120 may, e.g., be configured to generate the loudspeaker signals further depending on the number of the loudspeakers of a playback environment.

In an embodiment, the object renderer 120 may, e.g., be configured to generate the loudspeaker signals further depending on a loudspeaker position of each of the loudspeakers of the playback environment.

According to an embodiment, the object metadata processor 110 is configured to calculate the second position of the audio object depending on the first position of the audio object and depending on the size of the screen if the audio object is indicated in the metadata as being screen-related, wherein the first position indicates the first position in a three-dimensional space, and wherein the second position indicates the second position in the three-dimensional space.

In an embodiment, the object metadata processor 110 may, e.g., be configured to calculate the second position of the audio object depending on the first position of the audio object and depending on the size of the screen if the audio object is indicated in the metadata as being screen-related, wherein the first position indicates a first azimuth, a first elevation and a first distance, and wherein the second position indicates a second azimuth, a second elevation and a second distance.

According to an embodiment, the object metadata processor 110 may, e.g., be configured to receive the metadata, comprising the indication on whether the audio object is screen-related as a first indication, and further comprising a second indication if the audio object is screen-related, said second indication indicating whether the audio object is an on-screen object. The object metadata processor 110 may, e.g., be configured to calculate the second position of the audio object depending on the first position of the audio object and depending on the size of the screen, such that the second position takes a first value on a screen area of the screen if the second indication indicates that the audio object is an on-screen object.

In an embodiment, the object metadata processor 110 may, e.g., be configured to calculate the second position of the audio object depending on the first position of the audio object and depending on the size of the screen, such that the second position takes a second value, which is either on the screen area or not on the screen area if the second indication indicates that the audio object is not an on-screen object.

According to an embodiment, the object metadata processor 110 may, e.g., be configured to receive the metadata, comprising the indication on whether the audio object is screen-related as a first indication, and further comprising a second indication if the audio object is screen-related, said second indication indicating whether the audio object is an on-screen object. The object metadata processor 110 may, e.g., be configured to calculate the second position of the audio object depending on the first position of the audio object, depending on the size of the screen, and depending on a first mapping curve as the mapping curve if the second indication indicates that the audio object is an on-screen object, wherein the first mapping curve defines a mapping of original object positions in a first value interval to remapped object positions in a second value interval. Moreover, the object metadata processor 110 may, e.g., be configured to calculate the second position of the audio object depending on the first position of the audio object, depending on the size of the screen, and depending on a second mapping curve as the mapping curve if the second indication indicates that the audio object is not an on-screen object, wherein the second mapping curve defines a mapping of original object positions in the first value interval to remapped object positions in a third value interval, and wherein said second value interval is comprised by the third value interval, and wherein said second value interval is smaller than said third value interval.

In an embodiment, each of the first value interval and the second value interval and the third value interval may, e.g., be a value interval of azimuth angles, or each of the first value interval and the second value interval and the third value interval may, e.g., be a value interval of elevation angles.

In the following, particular embodiments of the present invention and optional features of a plurality of embodiments of the present invention are described.

There could be audio-objects (audio signal associated with a position in the 3D space, e.g., azimuth, elevation and distance given) that are not intended for a fixed position, but whose position should change with the size of a screen in the reproduction setup.

If an object is signaled as screen-related (e.g., by a flag in the metadata), its position is remapped/recalculated with respect to the screen size according to a specific rule.

Figure 2:
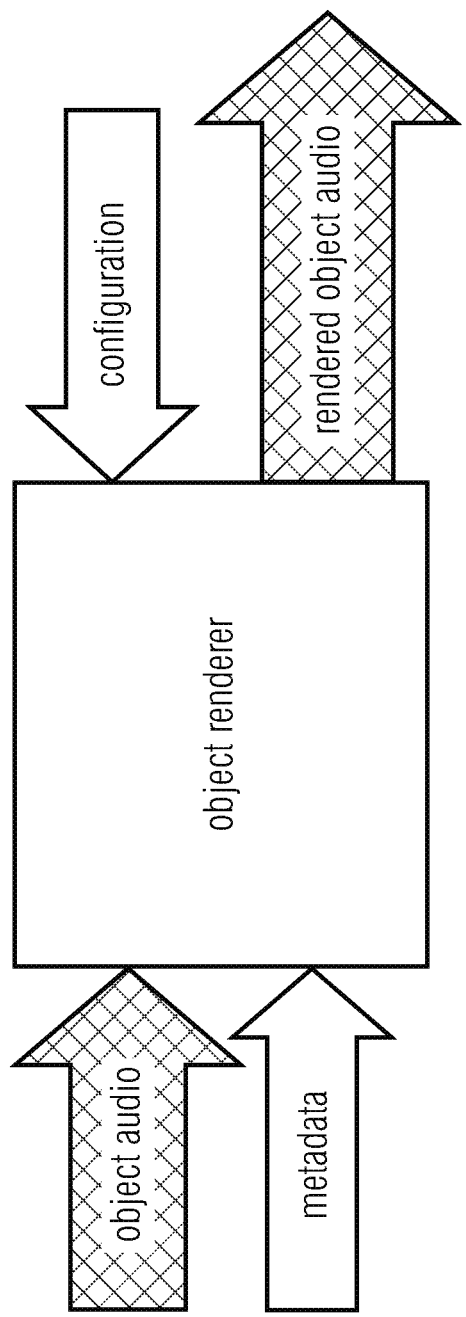
FIG. 2 illustrates an object renderer according to an embodiment.

FIG. 2 illustrates an object renderer according to an embodiment.

As an introduction, the following is noted:

In object-based audio formats metadata are stored or transmitted along with object signals. The audio objects are rendered on the playback side using the metadata and information about the playback environment. Such information is e.g., the number of loudspeakers or the size of the screen.

TABLE 1

Example metadata:

| | ObjectID |
|---|---|
| Dynamic OAM | Azimuth |
| | Elevation |
| | Gain |
| | Distance |
| Interactivity | AllowOnOff |
| | AllowPositionInteractivity |
| | AllowGainInteractivity |
| | DefaultOnOff |
| | Default Gain |
| | InteractivityMinGain |
| | InteractivtiyMaxGain |
| | InteractivityMinAzOffset |
| | InteractivityMaxAzOffset |
| | InteractivityMinElOffset |
| | InteractivityMaxElOffset |
| | InteractivityMinDist |
| | InteractivityMaxDist |
| Playout | IsSpeakerRelatedGroup |
| | SpeakerConfig3D |
| | AzimuthScreenRelated |
| | ElevationScreenRelated |
| | ClosestSpeakerPlayout |
| Content | ContentKind |
| | ContentLanguage |
| Group | GroupID |
| | GroupDescription |
| | GroupNumMembers |
| | GroupMembers |
| | Priority |
| Switch Group | SwitchGroupID |
| | SwitchGroupDescription |
| | SwitchGroupDefault |
| | SwitchGroupNumMembers |
| | SwitchGroupMembers |
| Audio Scene | NumGroupsTotal |
| | IsMainScene |
| | NumGroupsPresent |
| | NumSwitchGroups |

For objects geometric metadata can be used to define how they should be rendered, e.g., angles in azimuth or elevation or absolute positions relative to a reference point, e.g., the listener. The renderer calculates loudspeaker signals on the basis of the geometric data and the available speakers and their position.

Embodiments according to the present invention emerge from the above in the following manner.

In order to control screen related rendering, an additional metadata field controls how to interpret the geometric metadata:

If the field is set to OFF the geometric metadata is interpreted by the renderer to compute loudspeaker signals.

If the field is set to ON the geometric metadata is mapped from the nominal data to other values. The remapping is done on the geometric metadata, such that the renderer that follows the object metadata processor is agnostic of the pre-processing of the object metadata and operates unchanged. Examples of such metadata fields are given in the following tables.

TABLE 2

Example metadata to control the screen related rendering and their meaning:

| | |
|---|---|
| AzimuthScreenRelated | azimuth is adjusted to the screen size |
| ElevationScreenRelated | elevation is adjusted to the screen size |
| isScreenRelatedObject | Azimuth and elevation are remapped to render objects relative to the screen |
| isOnScreenObject | Object signal is related to an object positioned on screen |
| In addition, the nominal screen size or screen size used during production of the audio content could be send as metadata information. | |
| NominalScreenSize | screen size used during production of the audio content |

The following table presents an example of how such metadata could be coded efficiently.

TABLE 3

Syntax of ObjectMetadataConfig( ) according to an embodiment:

| Syntax | No. of bits | Mnemonic |
|---|---|---|
| ObjectMetadataConfig( ) { ... | | |
| hasScreenRelatedObjects; | 1 | bslbf |
| if( hasScreenRelatedObjects ) { | | |
| for ( o = 1; o <= num_objects; o++ ) { | | |
| isScreenRelativeObject[o]; | 1 | bslbf |
| if( !isScreenRelativeObject ){ | | |
| isOnScreenObject[o]; | 1 | bslbf |
| } | | |
| } | | |
| } | | |
| } | | |

| | |
|---|---|
| hasOnScreenObjects | This flag specifies whether screen-related objects are present. |
| isScreenRelatedObject | This flag defines whether an object position is screen-relative (the position should be rendered differently, such that their position is remapped, but can still contain all valid angular values. |
| isOnScreenObject | This flag defines that the corresponding object is "onscreen". Objects where this flag is equal to 1 should be rendered differently, such that their position can only take values on the screen area. In accordance with an alternative, the flag is not used, but a reference screen angle is defined. If isScreenRelativeObject=1 then all angles are relative to this reference angle. There might be other use cases where it needs to be known that the audio object is on screen. |

It is noted with respect to isScreenRelativeObject that, according to an embodiment, there are two possibilities: Remapping of position, but it can still take all values (screen-relative) and remapping such that it can only contain values that are on the screen area (on-screen).

The remapping is done in an object metadata processor that takes the local screen size into account and performs the mapping of the geometric metadata.

Figure 3:
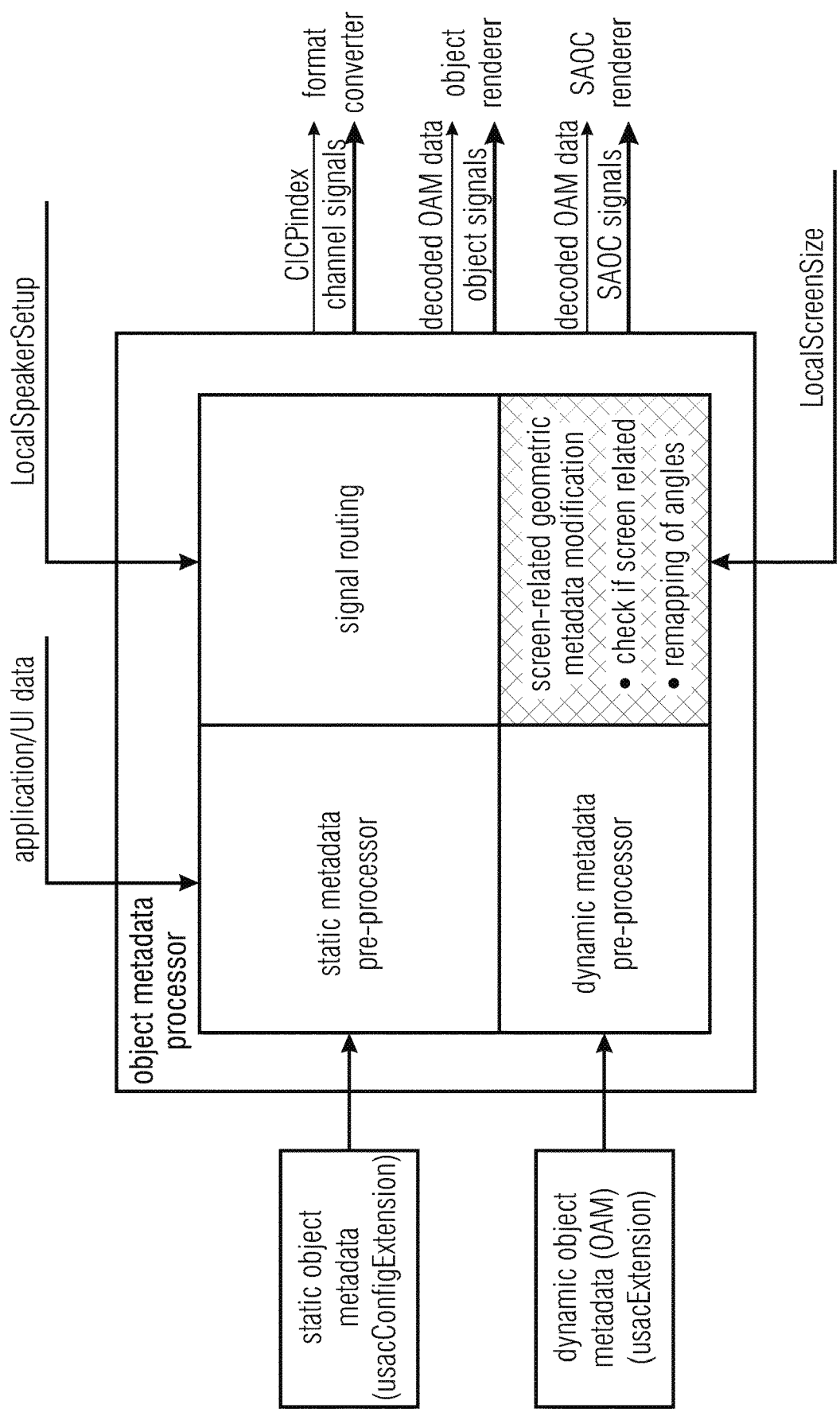
FIG. 3 illustrates an object metadata processor according to an embodiment.

FIG. 3 illustrates an object metadata processor according to an embodiment.

As to screen-related geometric metadata modification, the following is said.

Depending on the information isScreenRelativeObject and isOnScreenObject there are two possibilities to signal screen-related audio elements:

a) Screen-relative audio elements
b) On-Screen Audio Elements

In both cases, the position data of the audio elements are remapped by the Object Metadata Processor. A curve is applied that maps the original azimuth and elevation angle of the position to a remapped azimuth and a remapped elevation angle The reference is the nominal screen size in the metadata or an assumed default screen size.

E.g., a viewing angle defined in ITU-R REC-BT.2022 (General viewing conditions for subjective assessment of quality of SDTV and HDTV television pictures on flat panel displays) can be used.

The difference between the two types of screen-relation is the definition of the remapping curve.

In case a) the remapped azimuth can take values between −180° and 180° and the remapped elevation can take values between −90° and 90°. The curve is defined such that the azimuth values between a default left edge azimuth and a default right edge azimuth are mapped (compressed or expanded) to the interval between the given left screen edge and the given right screen edge (and accordingly for the elevation). The other azimuth and elevation values are compressed or expanded accordingly, such that the whole range of values is covered.

Figure 4:
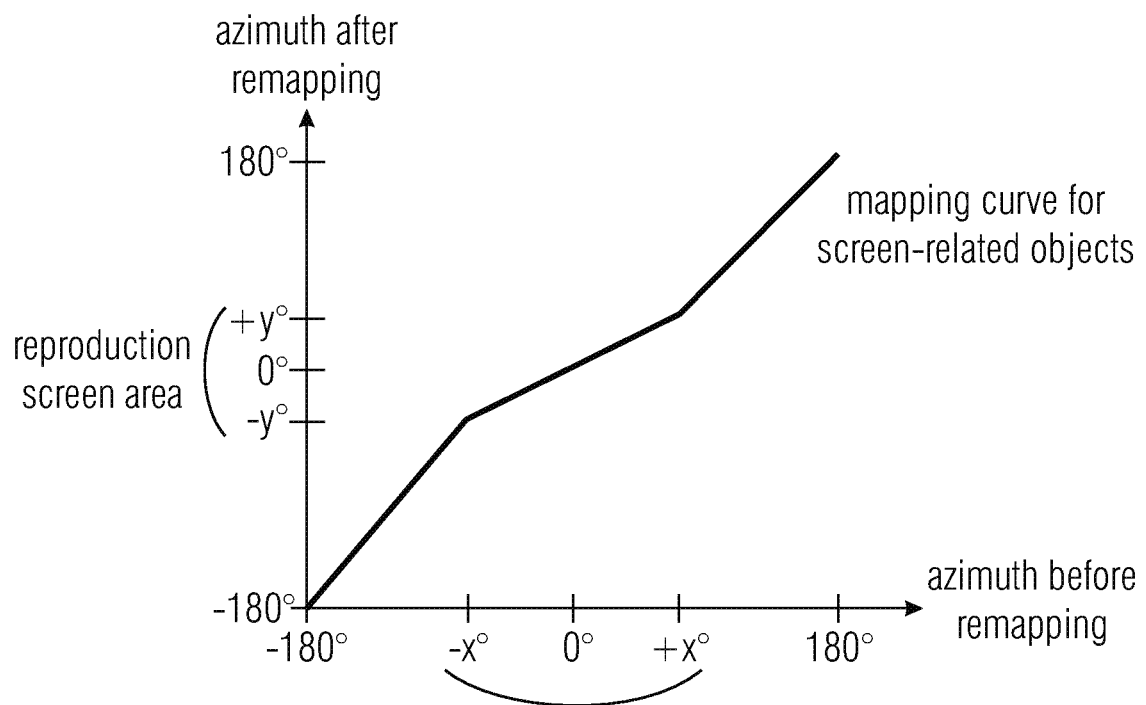
FIG. 4 illustrates azimuth remapping according to embodiments.
Figure 4:
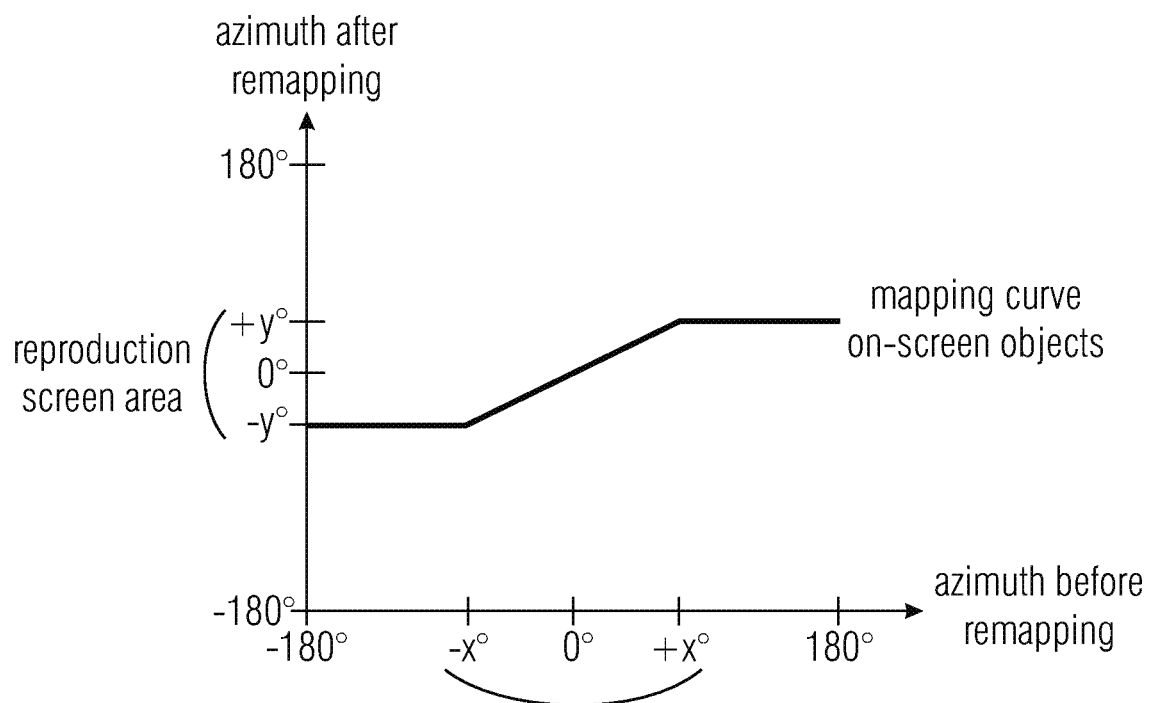

FIG. 4 illustrates azimuth remapping according to embodiments.

In case b) the remapped azimuth and elevation can only take values that describe positions on the screen area (Azimuth(left screen edge) Azimuth(remapped) Azimuth(right screen edge) and Elevation(lower screen edge) Elevation (remapped) Elevation(upper screen edge)).

There are different possibilities to treat the values outside these ranges: They could either be mapped to the edges of the screen such that all objects between −180° azimuth and the left screen edge end up at the left screen edge and all objects between the right screen edge and 180° azimuth end up at the right screen. Another possibility is to map the values of the rear hemisphere to the frontal hemisphere. On the left hemisphere then the positions between −180°+ Azimuth(left screen edge) and Azimuth(left screen edge) are mapped to the left screen edge. The values between −180° and −180°+Azimuth(left screen edge) are mapped to the values between 0° and Azimuth(left screen edge). The right hemisphere and the elevation angles are treated the same way.

Figure 5:
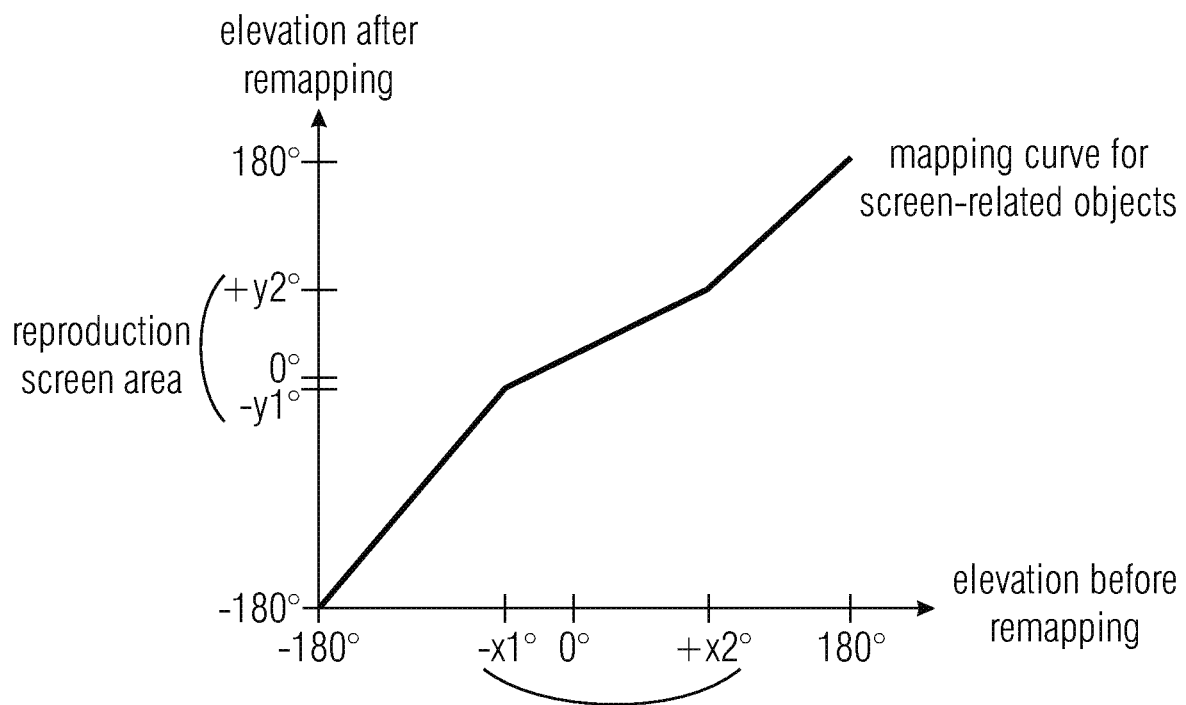
FIG. 5 illustrates elevation remapping according to embodiments.
Figure 5:
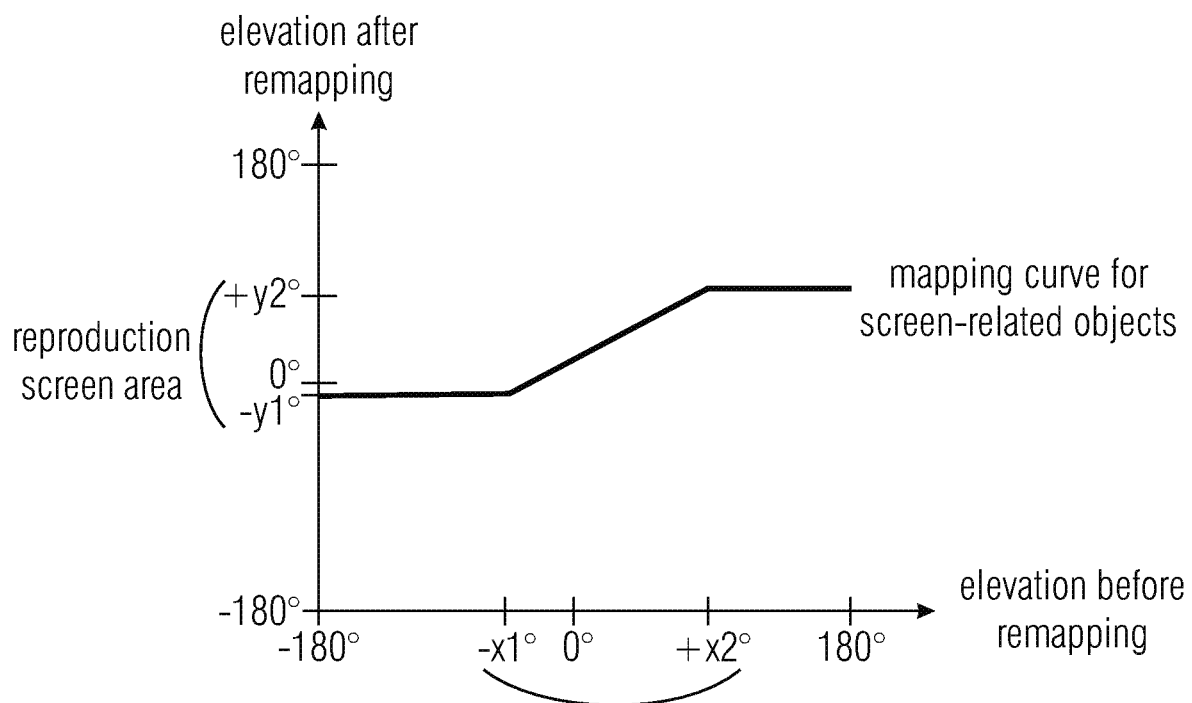

FIG. 5 illustrates elevation remapping according to embodiments.

The points −x1 and +x2 (which might be different or equal to +x1) of the curve where the gradient changes either be set as default values (default assumed standard screen size+ position) or they can be present in the metadata (e.g., by the producer, who could then put the production screen size there).

There are also mapping functions possible which do not consist of linear segments, but are curved instead.

Additional metadata could control the way remapping, e.g., defining offsets or non-linear coefficients to account for panning behavior or the resolution of the hearing.

Also it could be signaled how the mapping is performed, e.g., by "projecting" all objects intended for the rear onto the screen.

Such alternative mapping methods are listen in the following figures.

Figure 6:
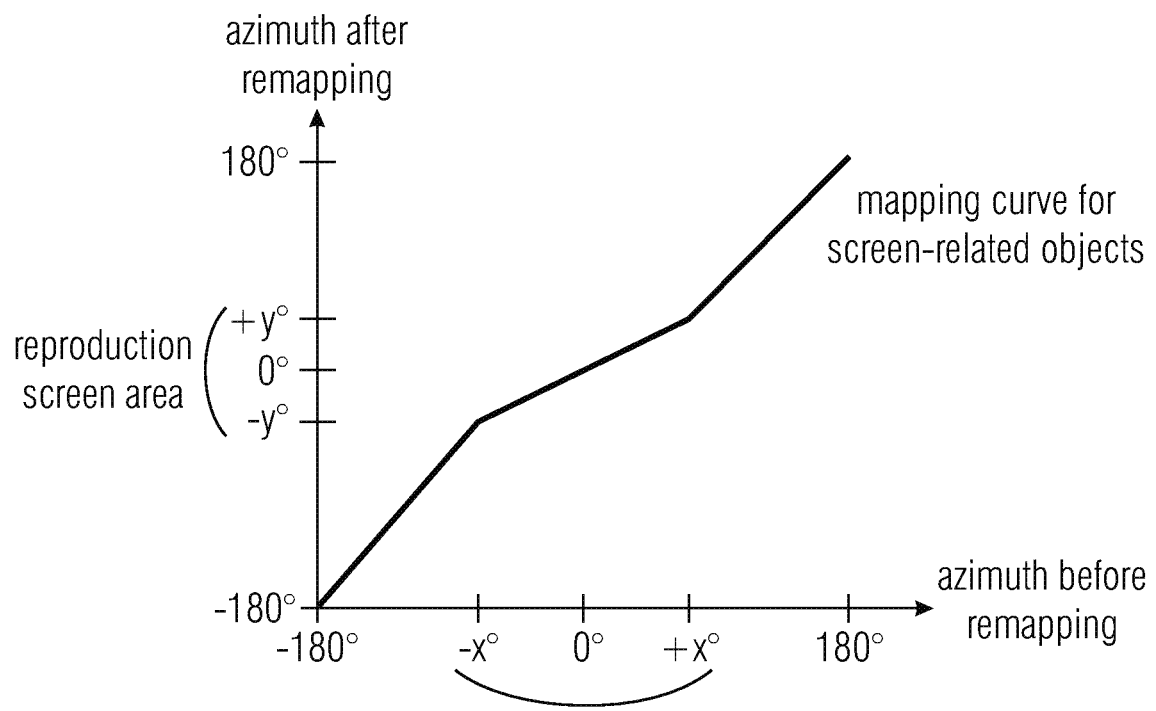
FIG. 6 illustrates azimuth remapping according to embodiments.
Figure 6:
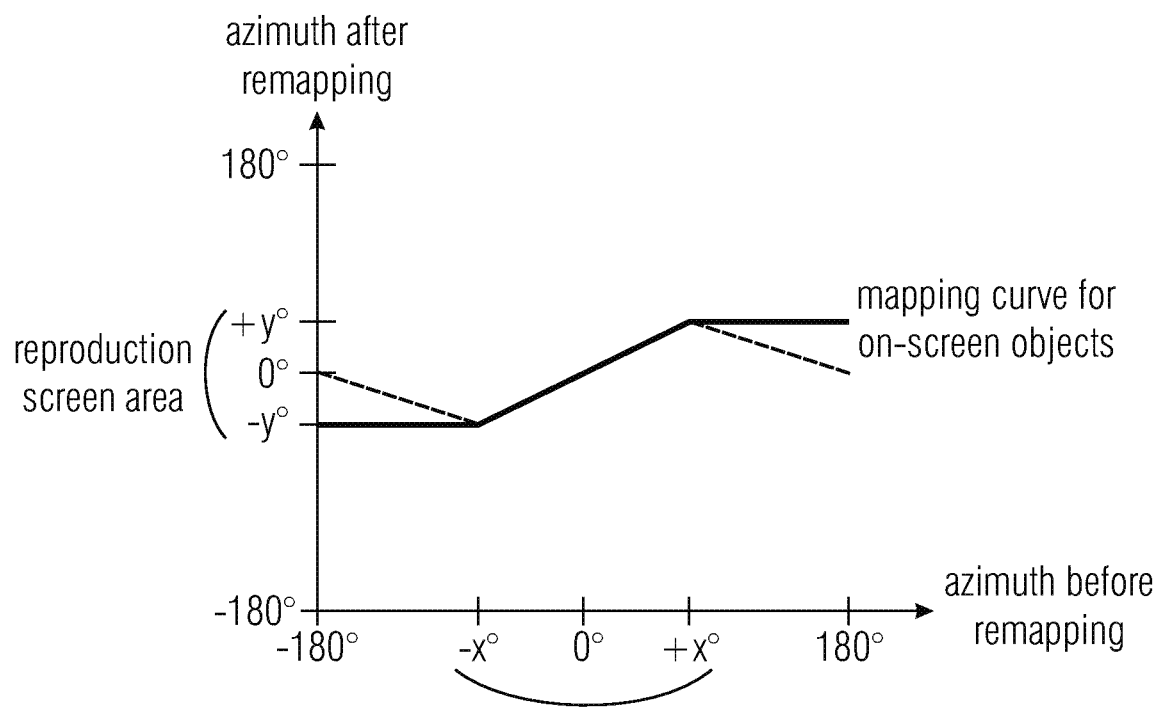

There, FIG. 6 illustrates azimuth remapping according to embodiments.

Figure 7:
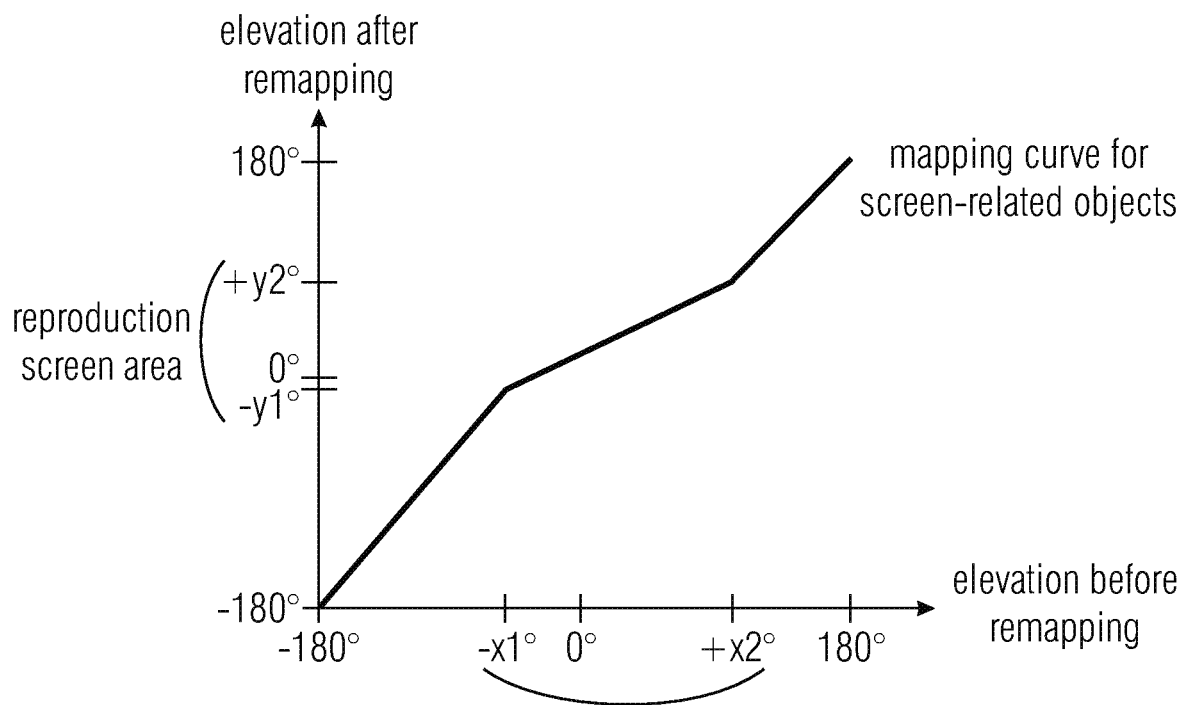
FIG. 7 illustrates elevation remapping according to other embodiments.
Figure 7:
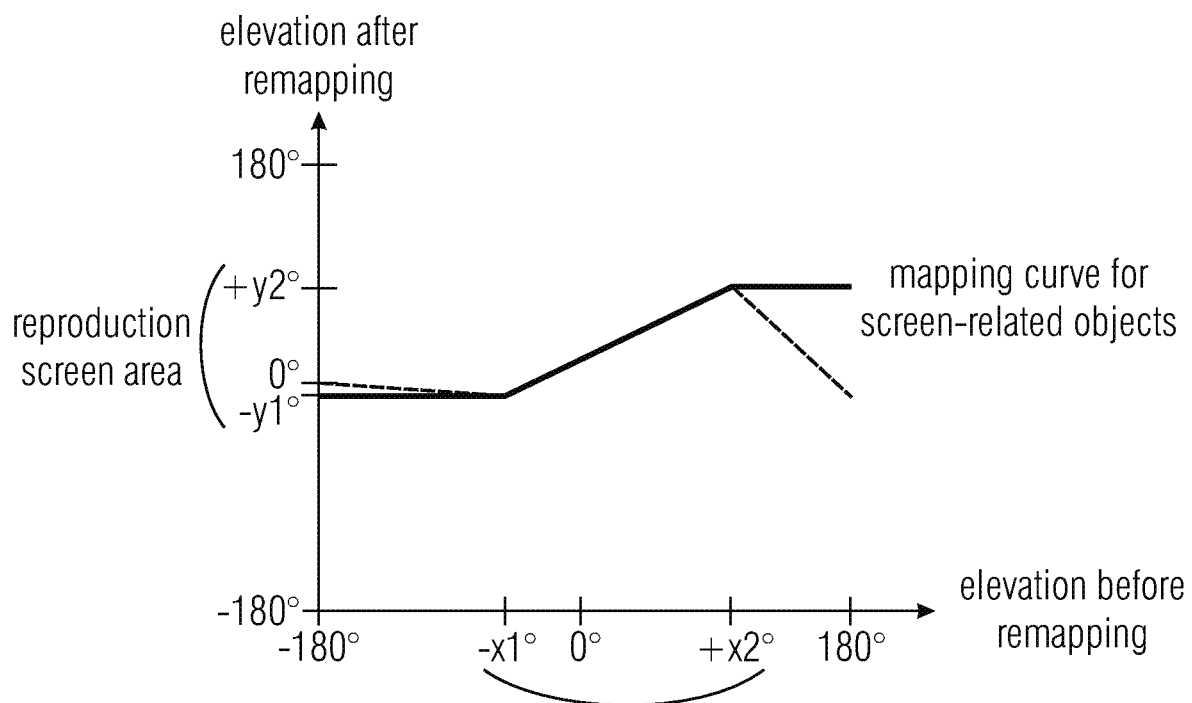

FIG. 7 illustrates elevation remapping according to embodiments.

Regarding unknown screen size behavior:
if no reproduction screen size is given, then either
  a default screen size is assumed, or
  no mapping is applied, even if an object is marked as screen-related or on-screen.

Returning to FIG. 4, in another embodiment, in case b) the remapped azimuth and elevation can only take values that describe positions on the screen area (Azimuth(left screen edge) Azimuth(remapped) Azimuth(right screen edge) and Elevation(lower screen edge) Elevation(remapped) Elevation(upper screen edge)). There are different possibilities to treat the values outside these ranges: In some embodiments, they could either be mapped to the edges of the screen such that all objects between +180° azimuth and the left screen edge end up at the left screen edge and all objects between the right screen edge and −180° azimuth end up at the right screen edge. Another possibility is to map the values of the rear hemisphere to the frontal hemisphere.

On the left hemisphere then the positions between +180°—Azimuth(left screen edge) and Azimuth(left screen edge) are mapped to the left screen edge. The values between +180° and +180°—Azimuth(left screen edge) are mapped to the values between 0° and Azimuth(left screen edge). The right hemisphere and the elevation angles are treated the same way.

Figure 16:
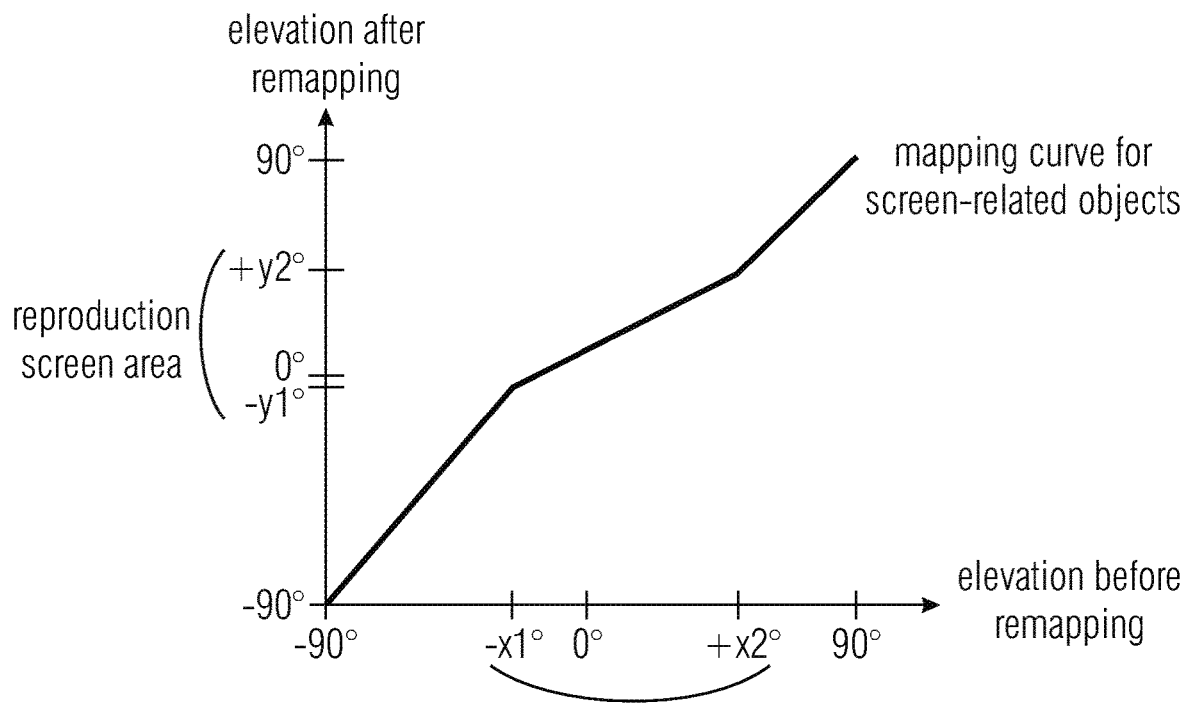
FIG. 16 illustrates elevation remapping according to other embodiments.
Figure 16:
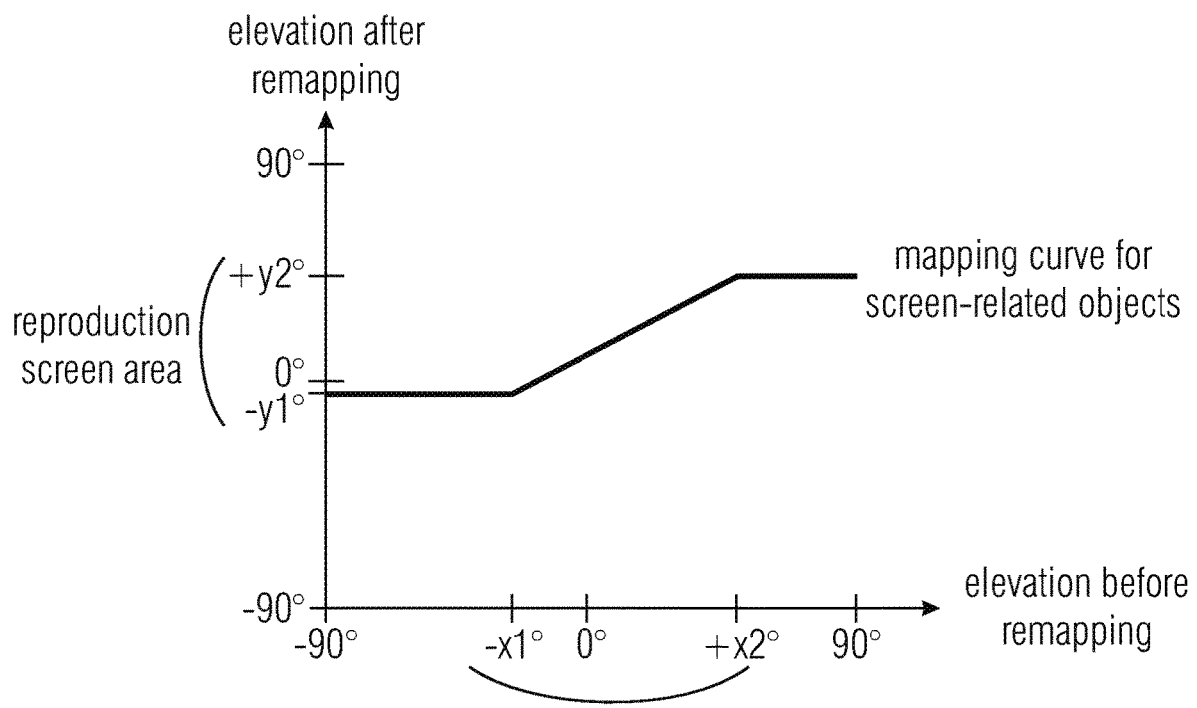

FIG. 16 illustrates is a figure similar to FIG. 5. In the embodiments illustrated by FIG. 16, in both diagrams, a value interval on the abscissa axis from −90° to +90° and a value interval on the ordinate axis from −90° to +90° is illustrated.

Figure 17:
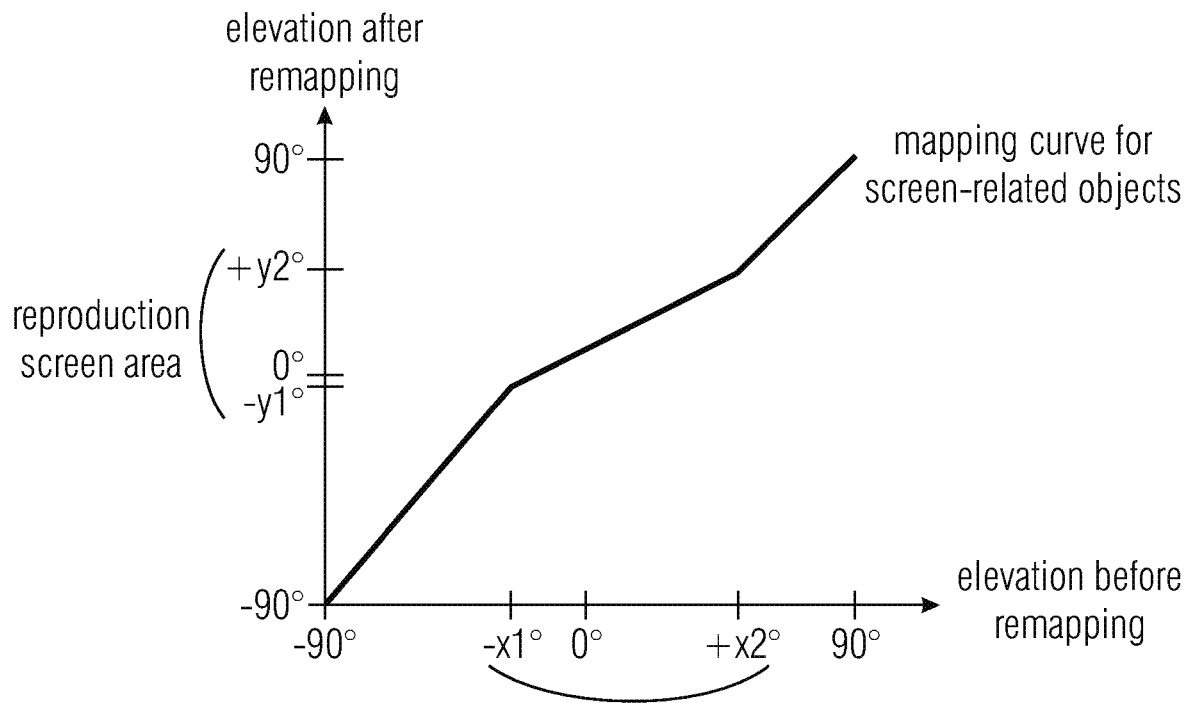
FIG. 17 illustrates elevation remapping according to further embodiments.
Figure 17:
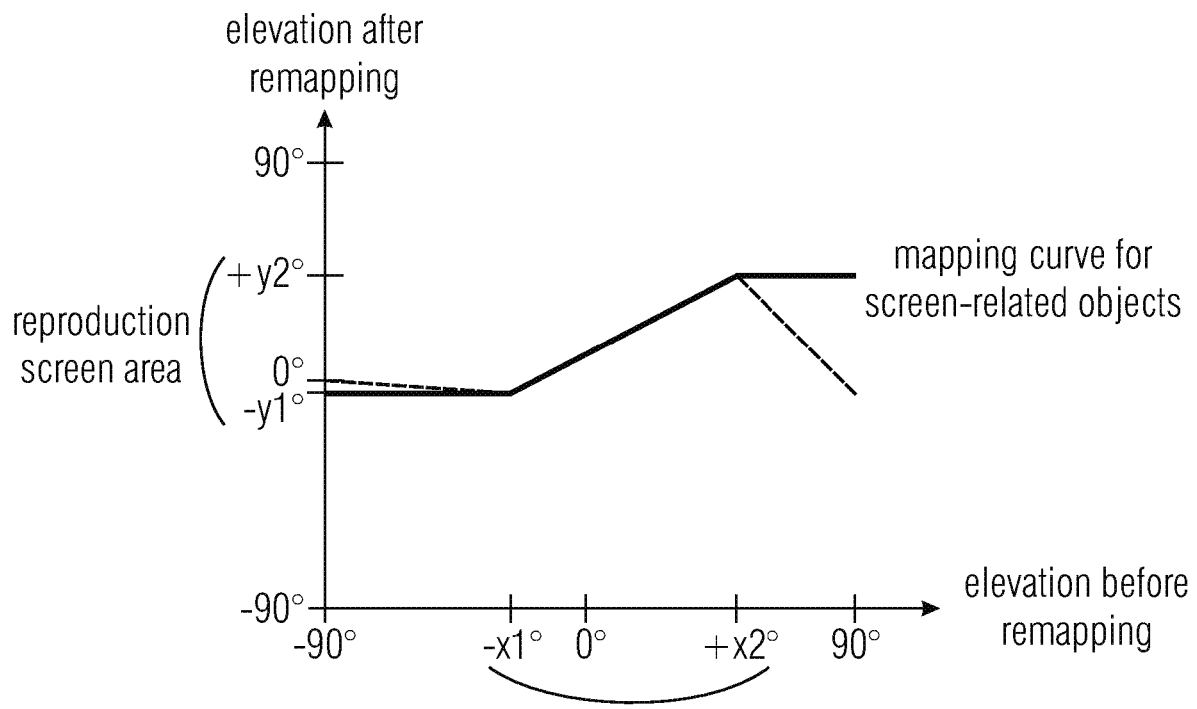

FIG. 17 illustrates is a figure similar to FIG. 7. In the embodiments illustrated by FIG. 17, in both diagrams, a value interval on the abscissa axis from −90° to +90° and a value interval on the ordinate axis from −90° to +90° is illustrated.

In the following, further embodiments of the invention and optional features of further embodiments are described with reference to FIG. 8-FIG. 15.

According to some embodiments, screen-related element remapping may, for example, only be processed if the bitstream contains screen-related elements (isScreenRelativeObject flag==1 for at least one audio element) that are accompanied by OAM data (OAM data=associated object metadata) and if the local screen-size is signaled to the decoder via the LocalScreenSize( ) interface.

The geometric positional data (OAM data before any position modification by user interaction has happened) may, e.g., be mapped to a different range of values by the definition and utilization of a mapping-function. The remapping may, e.g., change the geometric positional data as a pre-processing step to the rendering, such that the renderer is agnostic of the remapping and operates unchanged.

The screen-size of a nominal reference screen (used in the mixing and monitoring process) and/or the local screen-size information in the playback room may, e.g., be taken into account for the remapping.

If no nominal reference screen-size is given, default reference values may, e.g., be used, for example, assuming a 4 k display and an optimal viewing distance.

If no local screen-size information is given, then remapping shall, for example, not be applied.

Two linear mapping functions may, for example, be defined for the remapping of the elevation and the azimuth values:

The screen edges of the nominal screen size may, for example, be given by:
$\varphi_{left}^{nominal}, \varphi_{right}^{nominal}, \theta_{top}^{nominal}, \theta_{bottom}^{nominal}$ The reproduction screen edges may, for example, be abbreviated by:
$\varphi_{left}^{repro}, \varphi_{right}^{repro}, \theta_{top}^{repro}, \theta_{bottom}^{repro}$ The remapping of the azimuth and elevation position data may, for example, be defined by the following linear mapping functions:

$$\varphi' = \begin{cases} \frac{\varphi_{right}^{repro} + 180°}{\varphi_{right}^{nominal} + 180°} \cdot (\varphi + 180°) - 180° & \text{for } -180° \leq \varphi < \varphi_{right}^{nominal} \\ \frac{\varphi_{left}^{repro} - \varphi_{right}^{repro}}{\varphi_{left}^{nominal} - \varphi_{right}^{nominal}} \cdot (\varphi - \varphi_{right}^{nominal}) + \varphi_{right}^{repro} & \text{for } \varphi_{right}^{nominal} \leq \varphi < \varphi_{left}^{nominal} \\ \frac{180° - \varphi_{left}^{repro}}{180° - \varphi_{left}^{nominal}} \cdot (\varphi - \varphi_{left}^{nominal}) + \varphi_{left}^{repro} & \text{for } \varphi_{left}^{nominal} \leq \varphi < 180° \end{cases}$$

$$\theta' = \begin{cases} \frac{\theta_{bottom}^{repro} + 90°}{\theta_{bottom}^{nominal} + 90°} \cdot (\theta + 90°) - 90° & \text{for } -90° \leq \theta < \theta_{bottom}^{nominal} \\ \frac{\theta_{top}^{repro} - \theta_{bottom}^{repro}}{\theta_{top}^{nominal} - \theta_{bottom}^{nominal}} \cdot (\theta - \theta_{bottom}^{nominal}) + \theta_{bottom}^{repro} & \text{for } \theta_{bottom}^{nominal} \leq \theta < \theta_{top}^{nominal} \\ \frac{90° - \theta_{top}^{repro}}{90° - \theta_{top}^{nominal}} \cdot (\theta - \theta_{top}^{nominal}) + \theta_{top}^{repro} & \text{for } \theta_{top}^{nominal} \leq \theta < 90° \end{cases}$$

Figure 13:
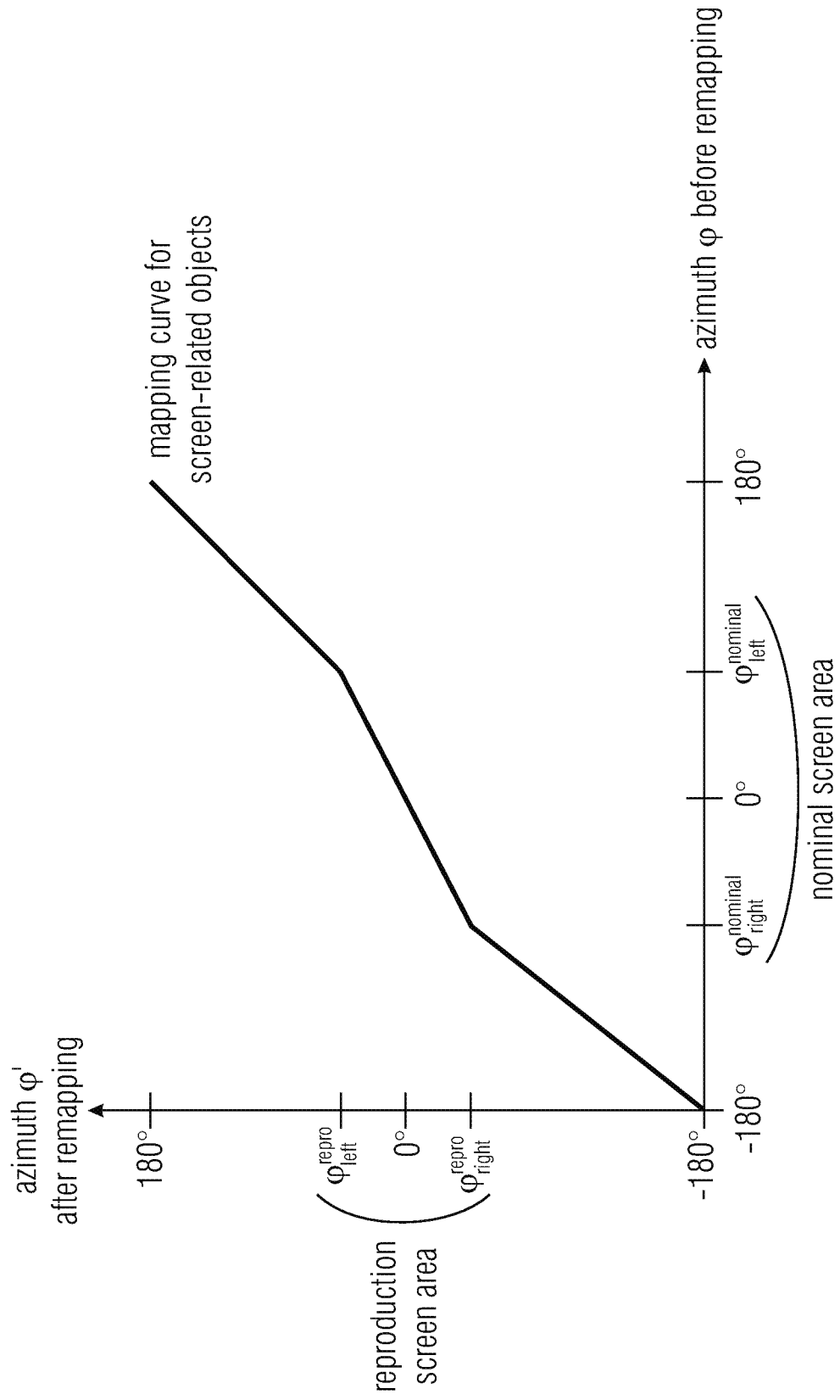
FIG. 13 illustrates azimuth remapping according to an embodiment.

FIG. 13 illustrates a remapping function of position data according to an embodiment. In particular, in FIG. 13, a mapping function for the mapping of the azimuth is depicted. In FIG. 13, the curve is defined such that the azimuth values between the nominal reference left edge azimuth and the nominal reference right edge azimuth are mapped (compressed or expanded) to the interval between the given local left screen edge and the given local right screen edge. The other azimuth values are compressed or expanded accordingly, such that the whole range of values is covered.

The remapped azimuth may, for example, take values between −180° and 180° and the remapped elevation can take values between −90° and 90°.

According to an embodiment, for example if the isScreen-RelativeObject flag is set to zero, then no screen-related element remapping is applied for the corresponding element and the geometric positional data (OAM data plus positional change by user interactivity) is directly used by the renderer to compute the playback signals.

According to some embodiments, the positions of all screen-related elements may, e.g., be remapped according to the reproduction screen-size as an adaptation to the reproduction room. For example if no reproduction screen-size information is given or no screen-related element exists, no remapping is applied.

The remapping may, e.g., be defined by linear mapping functions that take the reproduction screen-size information in the playback room and screen-size information of a reference screen, e.g., used in the mixing and monitoring process, into account.

An azimuth mapping function according to an embodiment is depicted in FIG. 13. In said FIG. 13, a mapping function of azimuth angles is illustrated. As in FIG. 13, it may, for example, be defined such that the azimuth values between the left edge and the right edge of the reference screen are mapped (compressed or expanded) to the interval between the left edge and the right edge of the reproduction screen. Other azimuth values are compressed or expanded, such that the whole range of values is covered.

Figure 14:
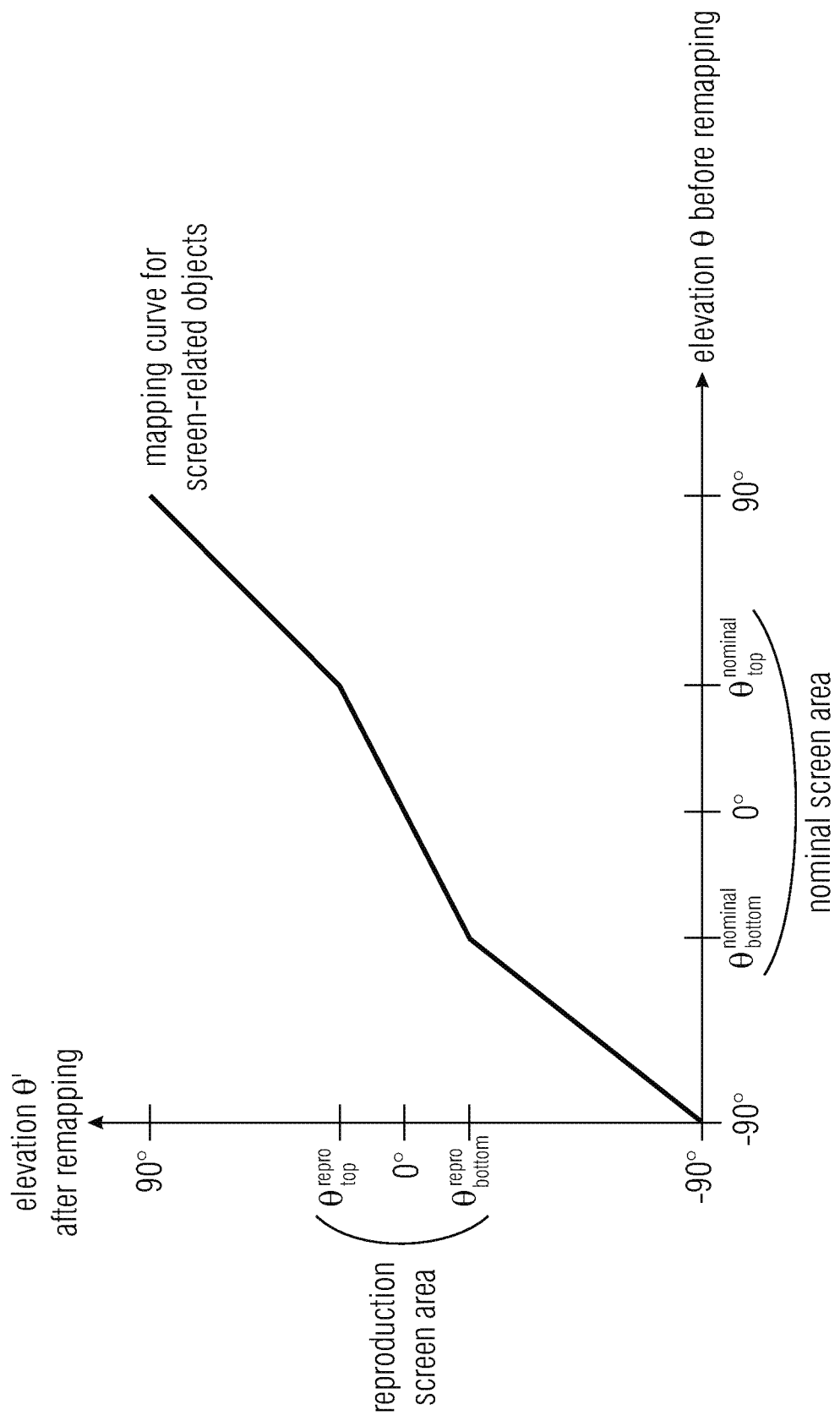
FIG. 14 illustrates remapping of elevation angles according to an embodiment.

An elevation mapping function may, e.g., be defined accordingly (see FIG. 14). The screen-related processing may, e.g., also take a zooming area for zooming into high-resolution video content into account. Screen-related processing may, e.g., only be defined for elements that are accompanied by dynamic position data and that are labeled as screen-related.

In the following, a system overview of a 3D audio codec system is provided. Embodiments of the present invention may be employed in such a 3D audio codec system. The 3D audio codec system may, e.g., be based on an MPEG-D USAC Codec for coding of channel and object signals.

According to embodiments, to increase the efficiency for coding a large amount of objects, MPEG SAOC technology has been adapted (SAOC=Spatial Audio Object Coding). For example, according to some embodiments, three types of renderers may, e.g., perform the tasks of rendering objects to channels, rendering channels to headphones or rendering channels to a different loudspeaker setup.

When object signals are explicitly transmitted or parametrically encoded using SAOC, the corresponding Object Metadata information is compressed and multiplexed into the 3D-Audio bitstream.

Figure 8:
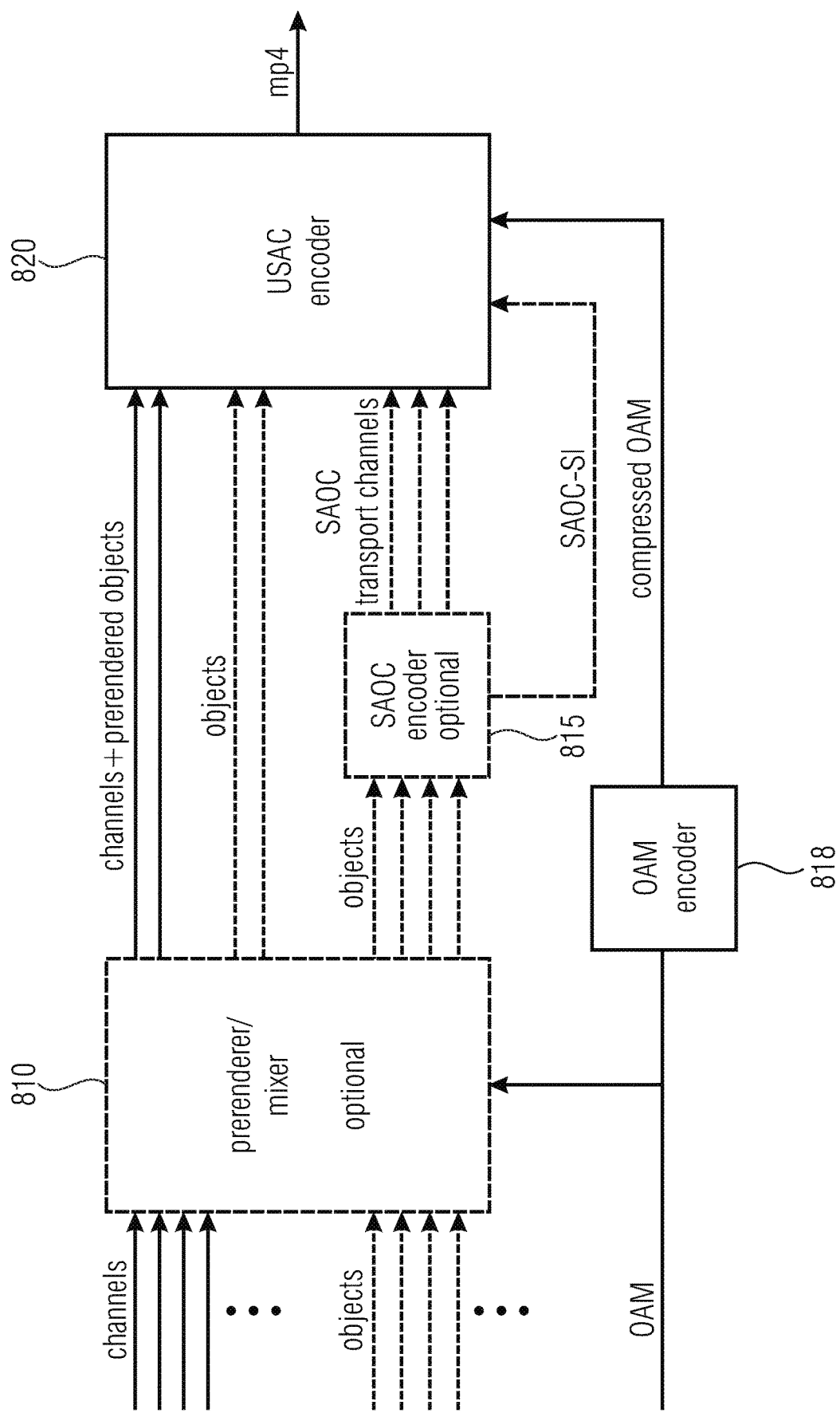
FIG. 8 illustrates an overview of a 3D-audio encoder.
Figure 9:
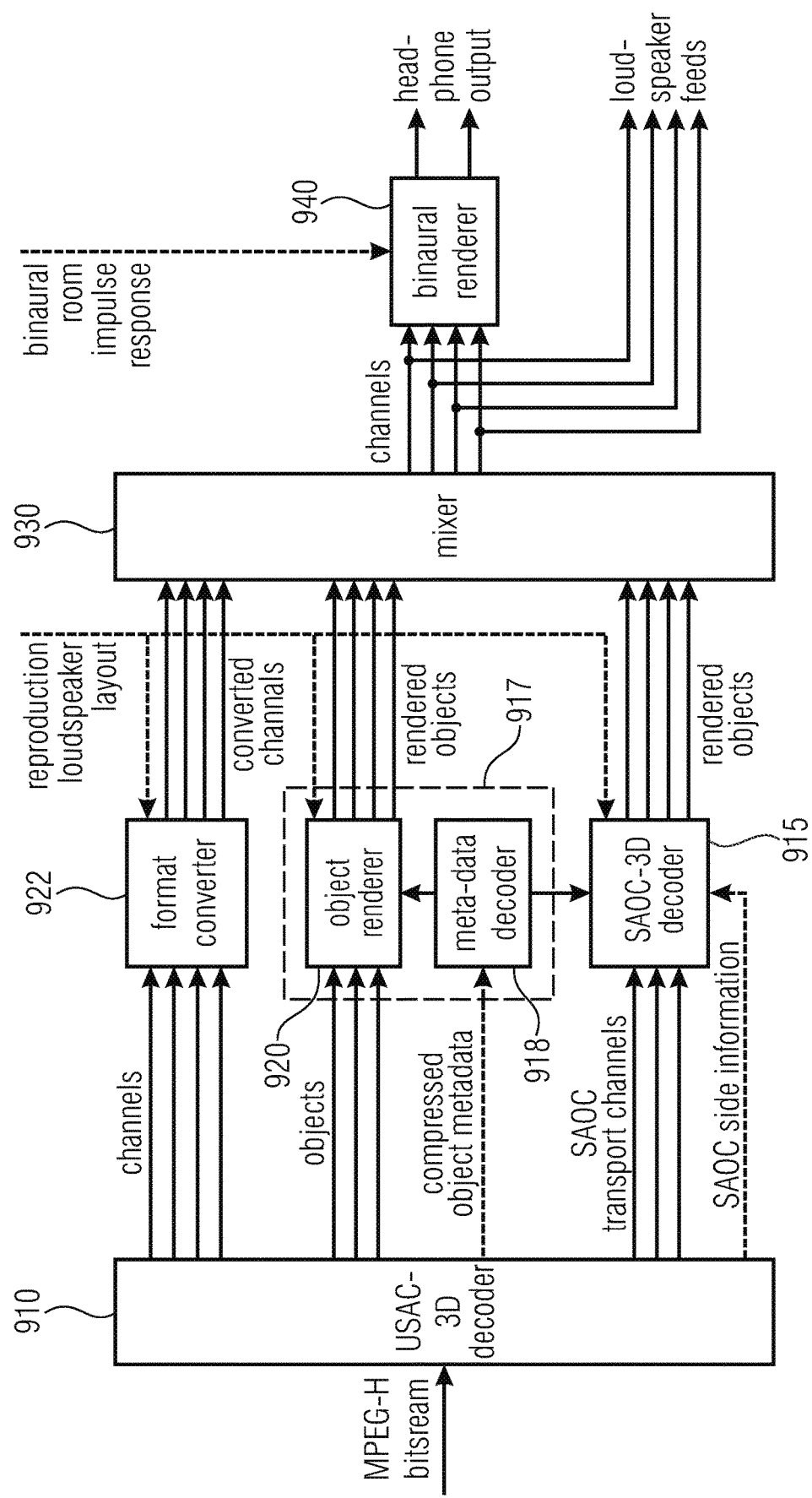
FIG. 9 illustrates an overview of a 3D-Audio decoder according to an embodiment.

FIG. 8 and FIG. 9 show the different algorithmic blocks of the 3D-Audio system. In particular, FIG. 8 illustrates an overview of a 3D-audio encoder. FIG. 9 illustrates an overview of a 3D-Audio decoder according to an embodiment.

Possible embodiments of the modules of FIG. 8 and FIG. 9 are now described.

In FIG. 8, a prerenderer 810 (also referred to as mixer) is illustrated. In the configuration of FIG. 8, the prerenderer 810 (mixer) is optional. The prerenderer 810 can be optionally used to convert a Channel+Object input scene into a channel scene before encoding. Functionally the prerenderer 810 on the encoder side may, e.g., be related to the functionality of object renderer/mixer 920 on the decoder side, which is described below. Prerendering of objects ensures a deterministic signal entropy at the encoder input that is basically independent of the number of simultaneously active object signals. With prerendering of objects, no object metadata transmission is required. Discrete Object Signals are rendered to the Channel Layout that the encoder is configured to use. The weights of the objects for each channel are obtained from the associated object metadata (OAM).

The core codec for loudspeaker-channel signals, discrete object signals, object downmix signals and pre-rendered signals is based on MPEG-D USAC technology (USAC Core Codec). The USAC encoder 820 (e.g., illustrated in FIG. 8) handles the coding of the multitude of signals by creating channel- and object mapping information based on the geometric and semantic information of the input's channel and object assignment. This mapping information describes, how input channels and objects are mapped to USAC-Channel Elements (CPEs, SCEs, LFEs) and the corresponding information is transmitted to the decoder.

All additional payloads like SAOC data or object metadata have been passed through extension elements and may, e.g., be considered in the USAC encoder's rate control.

The coding of objects is possible in different ways, depending on the rate/distortion requirements and the interactivity requirements for the renderer. The following object coding variants are possible:

Prerendered objects: Object signals are prerendered and mixed to the 22.2 channel signals before encoding. The subsequent coding chain sees 22.2 channel signals.

Discrete object waveforms: Objects are supplied as monophonic waveforms to the USAC encoder 820. The USAC encoder 820 uses single channel elements SCEs to transmit the objects in addition to the channel signals. The decoded objects are rendered and mixed at the receiver side. Compressed object metadata information is transmitted to the receiver/renderer alongside.

Parametric object waveforms: Object properties and their relation to each other are described by means of SAOC parameters. The down-mix of the object signals is coded with USAC by the USAC encoder 820. The parametric information is transmitted alongside. The number of downmix channels is chosen depending on the number of objects and the overall data rate. Compressed object metadata information is transmitted to the SAOC renderer.

On the decoder side, a USAC decoder 910 conducts USAC decoding.

Moreover, according to embodiments, a decoder device is provided, see FIG. 9. The decoder device comprises a USAC decoder 910 for decoding a bitstream to obtain one or more audio input channels, to obtain one or more input audio objects, to obtain compressed object metadata and to obtain one or more SAOC transport channels.

Furthermore, the decoder device comprises an SAOC decoder 915 for decoding the one or more SAOC transport channels to obtain a first group of one or more rendered audio objects.

Moreover, the decoder device comprises an apparatus 917 according to the embodiments described above with respect to FIGS. 1 to 7 or as described below with respect to FIGS. 11 to 15. The apparatus 917 comprises an object metadata decoder 918, e.g., being the object metadata processor 110 of the apparatus of FIG. 1, and being implemented for decoding the compressed object metadata to obtain uncompressed metadata.

Furthermore, the apparatus 917 according to the embodiments described above comprises an object renderer 920, e.g., being the object renderer 120 of the apparatus of FIG. 1, for rendering the one or more input audio objects depending on the uncompressed metadata to obtain a second group of one or more rendered audio objects.

Furthermore, the decoder device comprises a format converter 922 for converting the one or more audio input channels to obtain one or more converted channels.

Moreover, the decoder device comprises a mixer 930 for mixing the one or more audio objects of the first group of one or more rendered audio objects, the one or more audio objects of the second group of one or more rendered audio objects and the one or more converted channels to obtain one or more decoded audio channels.

In FIG. 9 a particular embodiment of a decoder device is illustrated. The SAOC encoder 815 (the SAOC encoder 815 is optional, see FIG. 8) and the SAOC decoder 915 (see FIG. 9) for object signals are based on MPEG SAOC technology. The system is capable of recreating, modifying and rendering a number of audio objects based on a smaller number of transmitted channels and additional parametric data (OLDs, IOCs, DMGs) (OLD=object level difference, IOC=inter object correlation, DMG=downmix gain). The additional parametric data exhibits a significantly lower data rate than that which may be used for transmitting all objects individually, making the coding very efficient.

The SAOC encoder 815 takes as input the object/channel signals as monophonic waveforms and outputs the parametric information (which is packed into the 3D-Audio bitstream) and the SAOC transport channels (which are encoded using single channel elements and transmitted).

The SAOC decoder 915 reconstructs the object/channel signals from the decoded SAOC transport channels and parametric information, and generates the output audio scene based on the reproduction layout, the decompressed object metadata information and optionally on the user interaction information.

Regarding object metadata codec, for each object, the associated metadata that specifies the geometrical position and spread of the object in 3D space is efficiently coded by quantization of the object properties in time and space, e.g., by the metadata encoder 818 of FIG. 8. The compressed object metadata cOAM (cOAM=compressed audio object metadata) is transmitted to the receiver as side information. At the receiver the cOAM is decoded by the metadata decoder 918.

For example, in FIG. 9, the metadata decoder 918 may, e.g., implement an object metadata processor according to one of the above-described embodiments.

An object renderer, e.g., object renderer 920 of FIG. 9, utilizes the compressed object metadata to generate object waveforms according to the given reproduction format. Each object is rendered to certain output channels according to its metadata. The output of this block results from the sum of the partial results.

For example, in FIG. 9, the object renderer 920 may, e.g., be implemented according to one of the above-described embodiments.

In FIG. 9, metadata decoder 918 may, e.g., be implemented as an object metadata processor as described according to one of the above-described or below-described embodiments, described with reference to FIGS. 1 to 7, and FIG. 11 to FIG. 15, and the object renderer 920 may, e.g., be implemented as an object renderer as described according to one of the above-described or below-described embodiments, described with reference to FIGS. 1 to 7, and FIG. 11 to FIG. 15. The metadata decoder 918 and the object renderer 920 may, e.g., together implement an apparatus 917 for generating loudspeaker signals as described above or as described below with reference to FIGS. 1 to 7, and FIG. 11 to FIG. 15.

If both channel based content as well as discrete/parametric objects are decoded, the channel based waveforms and the rendered object waveforms are mixed before outputting the resulting waveforms, e.g., by mixer 930 of FIG. 9 (or before feeding them to a postprocessor module like the binaural renderer or the loudspeaker renderer module).

A binaural renderer module 940, may, e.g., produce a binaural downmix of the multichannel audio material, such that each input channel is represented by a virtual sound source. The processing is conducted frame-wise in QMF domain. The binauralization may, e.g., be based on measured binaural room impulse responses.

A loudspeaker renderer 922 may, e.g., convert between the transmitted channel configuration and the desired reproduction format. It is thus called format converter 922 in the following. The format converter 922 performs conversions to lower numbers of output channels, e.g., it creates downmixes. The system automatically generates optimized downmix matrices for the given combination of input and output formats and applies these matrices in a downmix process. The format converter 922 allows for standard loudspeaker configurations as well as for random configurations with non-standard loudspeaker positions.

Figure 10:
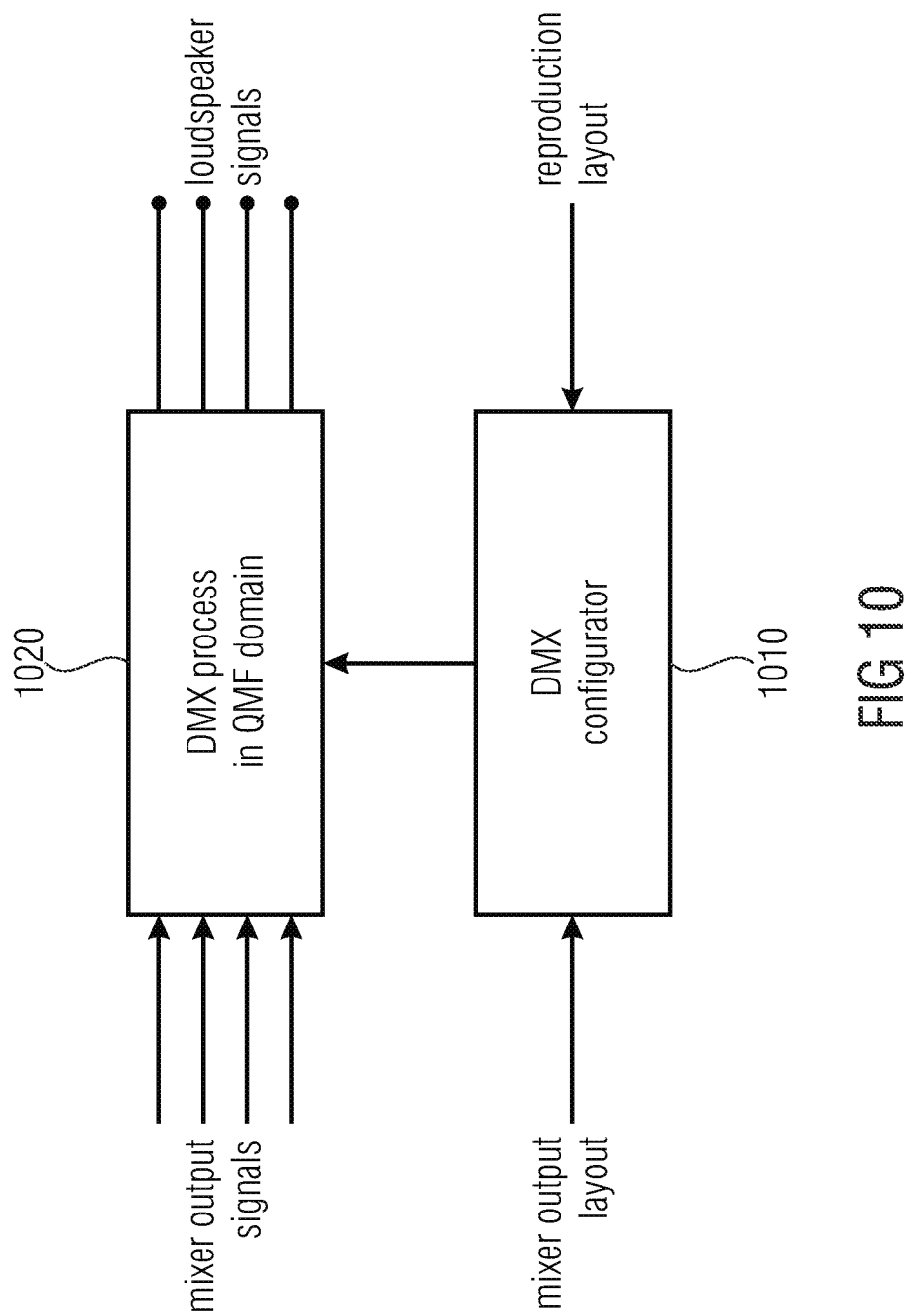
FIG. 10 illustrates a structure of a format converter.

FIG. 10 illustrates a structure of a format converter. FIG. 10 illustrates a downmix configurator 1010 and a downmix processor for processing the downmix in the QMF domain (QMF domain=quadrature mirror filter domain).

According to some embodiments, the object renderer 920 may be configured to realize screen related audio object remapping as described with respect to one of the above-described plurality of embodiments that have been described with reference to FIG. 1-FIG. 7, or as described with respect to one of the plurality of the below-described embodiments that will be described with reference to FIG. 11-FIG. 15.

In the following, further embodiments and concepts of embodiments of the present invention are described.

According to some embodiments, user control of objects may, for example, employ descriptive metadata, e.g., information about the existence of object inside the bitstream and high-level properties of objects and may, for example, employ restrictive metadata, e.g., information on how interaction is possible or enabled by the content creator.

According to some embodiments, signaling, delivery and rendering of audio objects may, for example, employ positional metadata, structural metadata, e.g., grouping and hierarchy of objects, an ability to render to specific speaker and to signal channel content as objects, and means to adapt object scene to screen size.

Embodiments provide new metadata fields were developed in addition to the already defined geometrical position and level of the object in 3D space.

If an object-based audio scene is reproduced in different reproduction setups, according to some embodiments, the positions of the rendered sound sources may, e.g., be automatically scaled to the dimension of the reproduction. In case audio-visual content is presented, the standard rendering of the audio objects to the reproduction may, e.g., lead to a violation of the positional audio-visual coherence as sound source locations and the position of the visual originator of the sound may, for example, no longer be consistent.

To avoid this effect, a possibility may, e.g., be employed to signal that audio objects are not intended for a fixed position in 3D space, but whose position should change with the size of a screen in the reproduction setup. According to some embodiments, a special treatment of these audio objects and a definition for a scene-scaling algorithm may, e.g., allow for a more immersive experience as the playback may, e.g., be optimized on local characteristics of the playback environment.

In some embodiments, a renderer or a preprocessing module may, e.g., take the local screen-size in the reproduction room into account, and may, e.g., thus preserve the relationship between audio and video in a movie or gaming context. In such embodiments, the audio scene may, e.g., then be automatically scaled according to the reproduction setup, such that the positions of visual elements and the position of a corresponding sound source are in agreement. Positional audio-visual coherence for screens varying in size may, e.g., be maintained.

For example, according to embodiments, dialogue and speech may, e.g., then be perceived from the direction of a speaker on the screen independent of the reproduction screen-size. This is then possible for standing sources as well as for moving sources where sound trajectories and movement of visual elements have to correspond.

In order to control screen related rendering, an additional metadata field is introduced that allows marking objects as screen-related. If the object is marked as screen-related its geometric positional metadata is remapped to other values before the rendering. For example, FIG. 13 illustrates an exemplary (re)mapping function for azimuth angles.

Inter alia, some embodiments may, e.g., achieve a simple mapping function is defined that works in the angular domain (azimuth, elevation).

Moreover, some embodiments, may, e.g., realize that the distance of objects is not changed, no "zooming" or virtual movement towards the screen or away from the screen is conducted, but a scaling just of the position of objects.

Furthermore, some embodiments, may, e.g., handle non-centered reproduction screens ($|\varphi_{left}^{repro}| \neq |\varphi_{right}^{repro}|$ and/or $|\theta_{top}^{repro}| \neq |\theta_{bottom}^{repro}|$) as the mapping function is not only based on the screen-ratio, but takes into account azimuth and elevation of the screen edges Moreover, some embodiments, may, e.g., define special mapping functions for on-screen objects. According to some embodiments, the mapping functions for azimuth and elevation may, e.g., be independent, so it may be chosen to remap only azimuth or elevation values.

In the following, further embodiments are provided.

Figure 11:
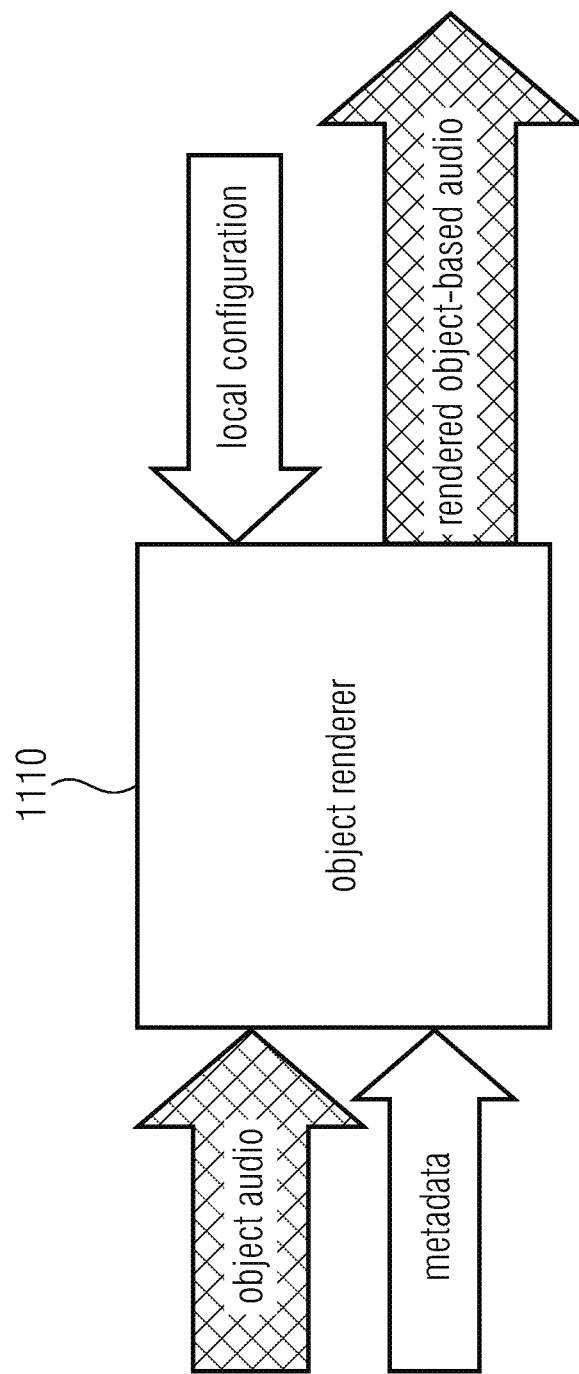
FIG. 11 illustrates rendering of object-based audio according to an embodiment.

FIG. 11 illustrates rendering of object-based audio according to an embodiment. The audio objects may, e.g., be rendered on the playback side using the metadata and information about the playback environment. Such information is, e.g., the number of loudspeakers or the size of the screen. The renderer 1110 may, e.g., calculate loudspeaker signals on the basis of the geometric data and the available speakers and their positions.

Now, an object metadata (pre)processor 1210 according to an embodiment is described with reference to FIG. 12.

Figure 12:
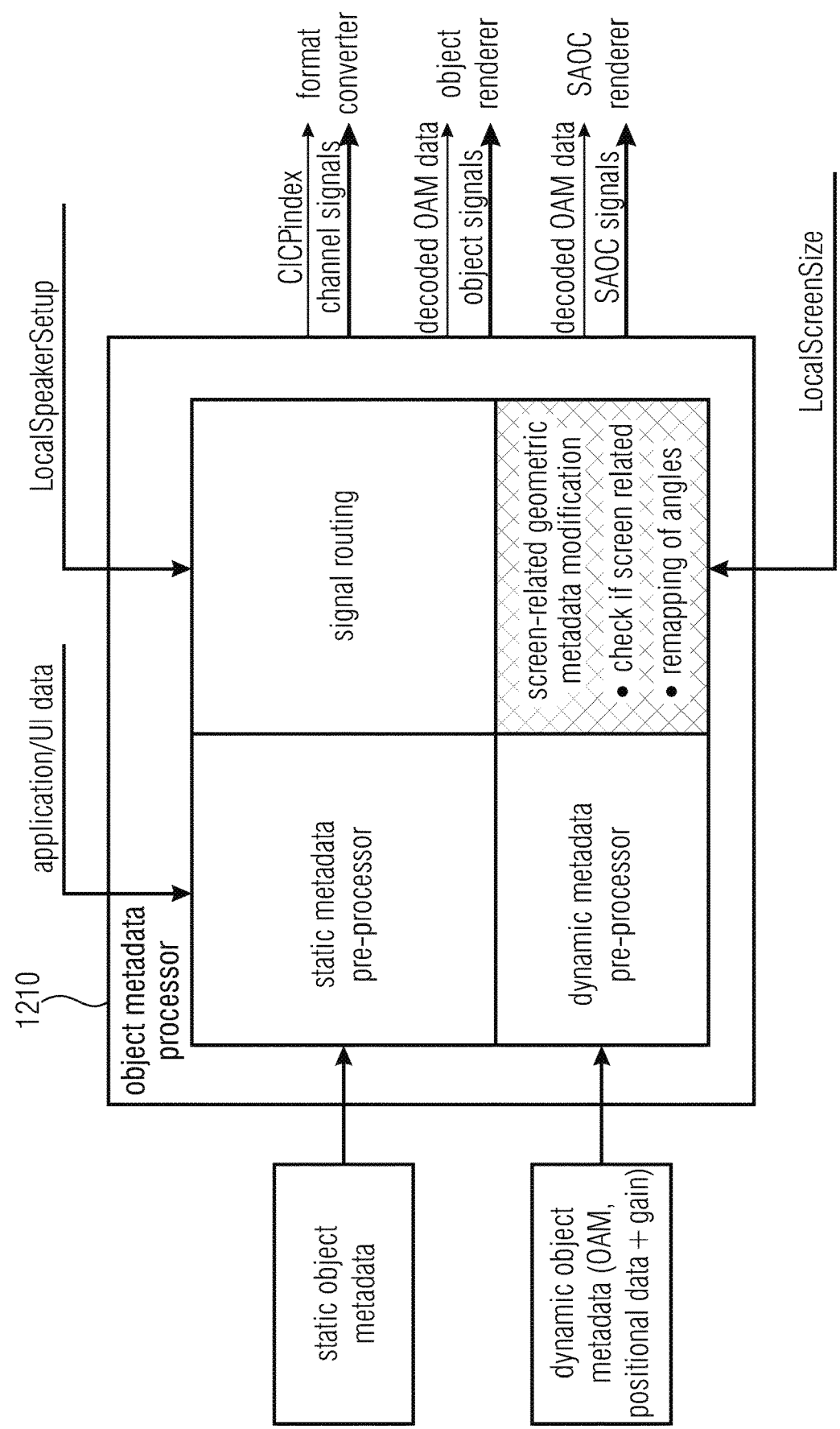
FIG. 12 illustrates an object metadata pre-processor according to an embodiment.

In FIG. 12, the object metadata processor 1210 is configured to conduct remapping that takes the local screen size into account and performs the mapping of the geometric metadata.

The position data of the screen-related objects are remapped by the object metadata processor 1210. A curve may, e.g., be applied that maps the original azimuth and elevation angle of the position to a remapped azimuth and a remapped elevation angle.

The screen-size of a nominal reference screen, e.g., employed in the mixing and monitoring process, and local screen-size information in the playback room may, e.g., be taken into account for the remapping.

The reference screen size, which may, e.g., be referred to as production screen size, may, e.g., be transmitted in the metadata.

In some embodiments if no nominal screen size is given, a default screen size may, e.g., assumed.

E.g., a viewing angle defined in ITU-R REC-BT.2022 (see: General viewing conditions for subjective assessment of quality of SDTV and HDTV television pictures on flat panel displays) may, e.g., be used.

In some embodiments, two linear mapping functions may, e.g., defined for the remapping of the elevation and the azimuth values.

In the following, screen-related geometric metadata modification according to some embodiments is described with reference to FIG. 13-FIG. 15.

The remapped azimuth can take values between $-180°$ and $180°$ and the remapped elevation can take values between $-90°$ and $90°$. The mapping curve is in general defined such that the azimuth values between a default left edge azimuth and a default right edge azimuth are mapped (compressed or expanded) to the interval between the given left screen edge and the given right screen edge (and accordingly for the elevation). The other azimuth and elevation values are compressed or expanded accordingly, such that the whole range of values is covered.

As already described above, the screen edges of the nominal screen size may, e.g., be given by:

$\varphi_{left}^{nominal}, \varphi_{right}^{nominal}, \theta_{top}^{nominal}, \theta_{bottom}^{nominal}$, The reproduction screen edges may, e.g., be abbreviated by:

$\varphi_{left}^{repro}, \varphi_{right}^{repro}, \theta_{top}^{repro}, \theta_{bottom}^{repro}$, The remapping of the azimuth and elevation position data may, e.g., be defined by the following linear mapping functions:

$$\varphi' = \begin{cases} \frac{\varphi_{right}^{repro} + 180°}{\varphi_{right}^{nominal} + 180°} \cdot (\varphi + 180°) - 180° & \text{for } -180° \leq \varphi < \varphi_{right}^{nominal} \\ \frac{\varphi_{left}^{repro} - \varphi_{right}^{repro}}{\varphi_{left}^{nominal} - \varphi_{right}^{nominal}} \cdot (\varphi - \varphi_{right}^{nominal}) + \varphi_{right}^{repro} & \text{for } \varphi_{right}^{nominal} \leq \varphi < \varphi_{left}^{nominal} \\ \frac{180° - \varphi_{left}^{repro}}{180° - \varphi_{left}^{nominal}} \cdot (\varphi - \varphi_{left}^{nominal}) + \varphi_{left}^{repro} & \text{for } \varphi_{left}^{nominal} \leq \varphi < 180° \end{cases}$$

$$\theta' = \begin{cases} \frac{\theta_{bottom}^{repro} + 90°}{\theta_{bottom}^{nominal} + 90°} \cdot (\theta + 90°) - 90° & \text{for } -90° \leq \theta < \theta_{bottom}^{nominal} \\ \frac{\theta_{top}^{repro} - \theta_{bottom}^{repro}}{\theta_{top}^{nominal} - \theta_{bottom}^{nominal}} \cdot (\theta - \theta_{bottom}^{nominal}) + \theta_{bottom}^{repro} & \text{for } \theta_{bottom}^{nominal} \leq \theta < \theta_{top}^{nominal} \\ \frac{90° - \theta_{top}^{repro}}{90° - \theta_{top}^{nominal}} \cdot (\theta - \theta_{top}^{nominal}) + \theta_{top}^{repro} & \text{for } \theta_{top}^{nominal} \leq \theta < 90° \end{cases}$$

The mapping function for the azimuth is depicted in FIG. 13 and the mapping function for the elevation is depicted in FIG. 14.

The points $\varphi_{left}^{nominal}$, $\varphi_{right}^{nominal}$, $\theta_{top}^{nominal}$, $\theta_{bottom}^{nominal}$, of the curves where the gradient changes can either be set as default values (default assumed standard screen size and default assumed standard screen position) or they can be present in the metadata (e.g., by the producer, who could then put the production/monitoring screen size there).

Regarding the definition of object metadata for screen-related remapping, in order to control screen related rendering, an additional metadata flag named "isScreenRelativeObject" is defined. This flag may, e.g., define if an audio object should be processed/rendered in relation to the local reproduction screen-size.

If there are screen-related elements present in the audio scene, then the possibility is offered to provide the screen-size information of a nominal reference screen that was used for mixing and monitoring (screen size used during production of the audio content).

TABLE 4

Syntax of ObjectMetadataConfig( ) according to an embodiment:

| Syntax | No. of bits | Mnemonic |
|---|---|---|
| ObjectMetadataConfig( ) | | |
| { | | |
| ... | | |
| hasScreenRelativeObjects; | 1 | bslbf |
| if( hasScreenRelatedObjects ) { | | |
| hasScreenSize; | 1 | bslbf |
| if( hasScreenSize ) { | | |
| bsScreenSizeAz; | 9 | uimsbf |

TABLE 4-continued

Syntax of ObjectMetadataConfig( )according to an embodiment:

```
        bsScreenSizeTopEl;                  9    uimsbf
        bsScreenSizeBottomEl;               9    uimsbf
      }
      for ( o = 0; o <= num_objects-1; o++ ) {
        isScreenRelativeObject[o];          1    bslbf
      }
    }
  }
}
```

| | |
|---|---|
| hasScreenRelativeObjects | This flag specifies whether screen-relative objects are present. |
| hasScreenSize | This flag specifies whether a nominal screen size is defined. The definition is done via viewing angles corresponding to the screen edges. In case hasScreenSize is zero, the following values are used as default:<br>$\varphi_{left}^{nominal} = 29.0°$<br>$\varphi_{right}^{nominal} = -29.0°$<br>$\theta_{top}^{nominal} = 17.5°$<br>$\theta_{bottom}^{nominal} = -17.5°$ |
| bsScreenSizeAz | This field defines the azimuth corresponding to the left and right screen edge:<br>$\varphi_{left}^{nominal} = 0.5 \cdot$ bsScreenSizeAz<br>$\varphi_{left}^{nominal} = $ min (max ( $\varphi_{left}^{nominal}$, 0), 180);<br>$\varphi_{right}^{nominal} = -0.5 \cdot$ bsScreenSizeAz<br>$\varphi_{right}^{nominal} = $ min (max ( $\varphi_{right}^{nominal}$, -180), 0); |
| bsScreenSizeTopEl | This field defines the elevation corresponding to the top screen edge:<br>$\theta_{top}^{nominal} = 0.5 \cdot$ bsScreenSizeTopEl - 255<br>$\theta_{top}^{nominal} = $ min (max ( $\theta_{top}^{nominal}$, -90, 90); |
| bsScreenSizeBottomEl | This field defines the elevation corresponding to the bottom screen edge:<br>$\theta_{bottom}^{nominal} = 0.5 \cdot$ bsScreenSizeBottomEl - 255<br>$\theta_{bottom}^{nominal} = $ min (max ( $\theta_{bottom}^{nominal}$, -90), 90); |
| isScreenRelativeObject | This flag defines whether an object position is screen-relative (the position should be rendered differently, such that their position is remapped, but can still contain all valid angular values). |

According to an embodiment if no reproduction screen size is given, then either a default reproduction screen size and a default reproduction screen position is assumed, or no mapping is applied, even if an object is marked as screen-related.

Some of the embodiments realize possible variations.

In some embodiments, non-linear mapping functions are employed. These mapping functions possible do not consist of linear segments, but are curved instead. In some embodiments, additional metadata control the way of remapping, e.g., defining offsets or non-linear coefficients to account for panning behavior or the resolution of the hearing.

Some embodiments realize independent processing of azimuth and elevation. Azimuth and elevation could be marked and processed as screen-related independently. Table 5 illustrates the syntax of ObjectMetadataConfig( ) according to such an embodiment.

TABLE 5

Syntax of ObjectMetadataConfig( ) according to an embodiment:

| Syntax | No. of bits | Mnemonic |
|---|---|---|
| ObjectMetadataConfig( ) | | |
| { | | |
| ... | | |
| hasScreenRelatedObjects; | 1 | bslbf |
| if( hasScreenRelatedObjects ) { | | |
| ... | | |
| for ( o = 0; o <= num_objects-1; o++ ) { | | |
| AzimuthScreenRelated[o]; | 1 | bslbf |
| ElevationScreenRelated[o]; | 1 | bslbf |
| } | | |
| } | | |
| } | | |

Some embodiments employ a definition of on-screen objects It may be distinguished between screen-related objects and on-screen objects. A possible syntax then could be the following of table 6:

TABLE 6

Syntax of ObjectMetadataConfig( )according to an embodiment:

| Syntax | No. of bits | Mnemonic |
|---|---|---|
| ObjectMetadataConfig( ) | | |
| { | | |
| ... | | |
| hasScreenRelatedObjects; | 1 | bslbf |
| if( hasScreenRelatedObjects ) { | | |
| ... | | |
| for ( o = 0; o <= num_objects-1; o++ ) { | | |
| isScreenRelativeObject[o]; | 1 | bslbf |
| if( !isScreenRelativeObject ){ | | |
| isOnScreenObject[o]; | 1 | bslbf |
| } | | |
| } | | |
| } | | |
| } | | |

| | |
|---|---|
| hasOnScreenObjects | This flag specifies whether screen-related objects are present. |
| isScreenRelatedObject | This flag defines whether an object position is screen-relative (the position should be rendered differently, such that their position is remapped, but can still contain all valid angular values). |
| isOnScreenObject | This flag defines that if the corresponding object is "onscreen". Objects where this flag is equal to 1 should be rendered differently, such that their position can only take values on the screen area. |

For on-screen objects the remapped azimuth and elevation can only take values that describe positions on the screen area ($\varphi_{left}^{repro} \leq \varphi' \leq \varphi_{right}^{repro}$ and $\theta_{top}^{repro} \geq \theta' \geq \theta_{bottom}^{repro}$).

As realized by some embodiments, there are different possibilities to treat the values outside these ranges: They could be mapped to the edges of the screen. On the left hemisphere then the positions between 180° and 180°—$\varphi_{left}^{nominal}$ are mapped to the left screen edge $\varphi_{left}^{nominal}$. The right hemisphere and the elevation angles are treated the same way (non-dashed mapping function 1510 in FIG. 15).

Another possibility realized by some of the embodiments is to map the values of the rear hemisphere to the frontal hemisphere. The values between 180° and 180°—$\varphi_{left}^{nominal}$ are mapped to the values between 0° and $\varphi_{left}^{repro}$. The right hemisphere and the elevation angles are treated the same way (dashed mapping function 1520 in FIG. 15).

Figure 15:
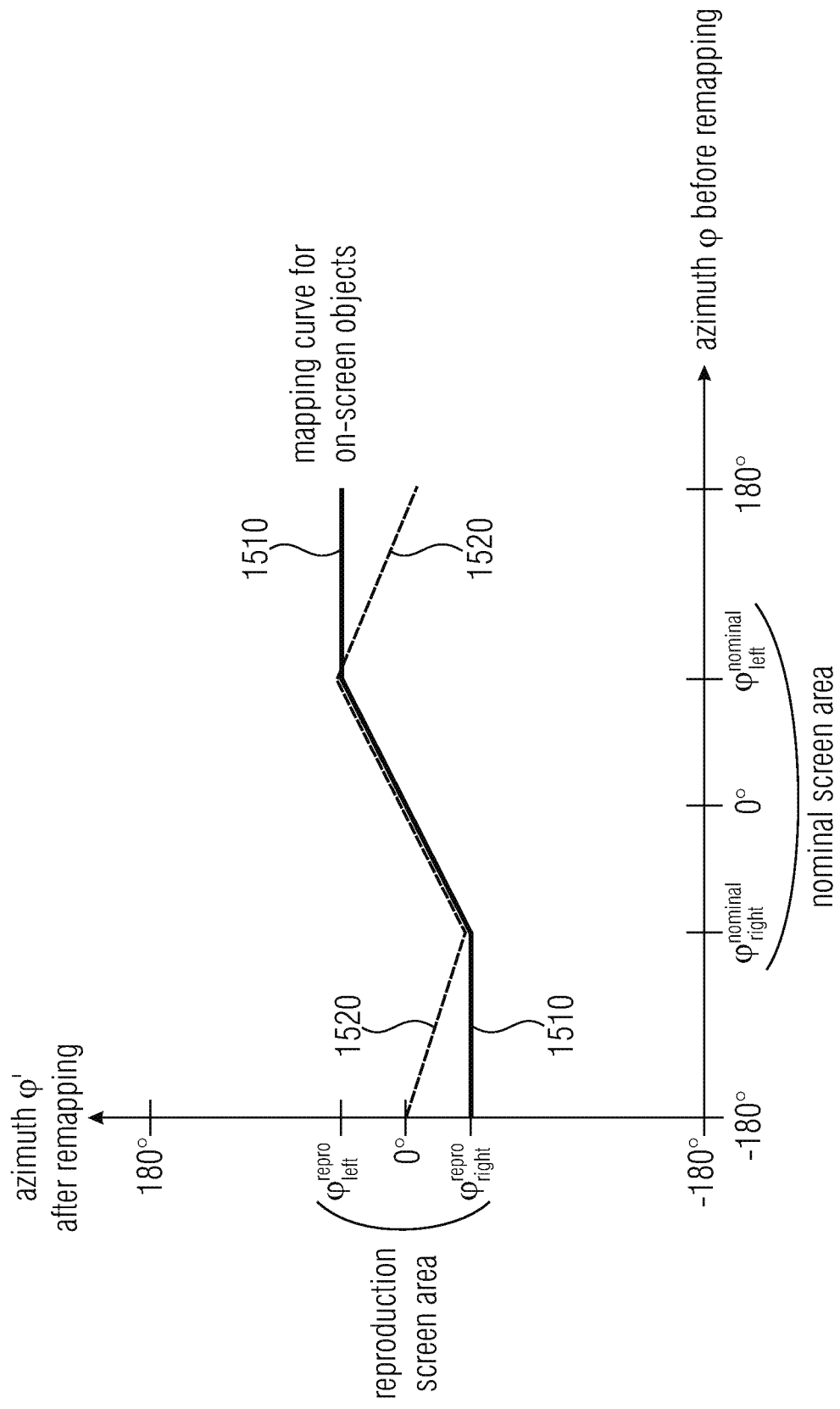
FIG. 15 illustrates remapping of azimuth angles according to an embodiment.

FIG. 15 illustrates remapping of azimuth angles (on-screen objects) according to these embodiments.

The choice of the desired behavior could be signaled by additional metadata (e.g., a flag for "projecting" all on-screen objects intended for the rear ([180° and 180°—$\varphi_{left}^{nominal}$] and [−180° and −180°—$\varphi_{right}^{nominal}$] onto the screen).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LITERATURE

[1] "Method and apparatus for playback of a higher-order ambisonics audio signal", Patent application number EP20120305271
[2] "Vorrichtung and Verfahren zum Bestimmen einer Wiedergabeposition", Patent application number WO2004073352A1
[3] "Verfahren zur Audiocodierung", Patent application number EP20020024643
[4] "Acoustical Zooming Based on a Parametric Sound Field Representation" http://www.aes.org/tmpFiles/elib/20140814/15417.pdf

The invention claimed is:

1. An apparatus for generating loudspeaker signals, comprising:
an object metadata processor, and
an object renderer,
wherein the object renderer is configured to receive an audio object,
wherein the object metadata processor is configured to receive metadata, comprising an indication on whether the audio object is screen-related, and further comprising a first position of the audio object,
wherein the object metadata processor is configured to calculate a second position of the audio object depending on the first position of the audio object and depending on a size of a screen if the audio object is indicated in the metadata as being screen-related,
wherein the object renderer is configured to generate the loudspeaker signals depending on the audio object and depending on position information,
wherein the object metadata processor is configured to feed the first position of the audio object as the position information into the object renderer if the audio object is indicated in the metadata as being not screen-related, and
wherein the object metadata processor is configured to feed the second position of the audio object as the position information into the object renderer if the audio object is indicated in the metadata as being screen-related.

2. The apparatus according to claim 1, wherein the object metadata processor is configured to not calculate the second position of the audio object if the audio object is indicated in the metadata as being not screen-related.

3. The apparatus according to claim 1, wherein the object renderer is configured to not determine whether the position information is the first position of the audio object or the second position of the audio object.

4. The apparatus according to claim 1, wherein the object renderer is configured to generate the loudspeaker signals further depending on the number of the loudspeakers of a playback environment.

5. The apparatus according to claim 4, wherein the object renderer is configured to generate the loudspeaker signals further depending on a loudspeaker position of each of the loudspeakers of the playback environment.

6. The apparatus according to claim 1, wherein the object metadata processor is configured to calculate the second position of the audio object depending on the first position of the audio object and depending on the size of the screen if the audio object is indicated in the metadata as being screen-related, wherein the first position indicates the first position in a three-dimensional space, and wherein the second position indicates the second position in the three-dimensional space.

7. The apparatus according to claim 6, wherein the object metadata processor is configured to calculate the second position of the audio object depending on the first position of the audio object and depending on the size of the screen if the audio object is indicated in the metadata as being screen-related, wherein the first position indicates a first azimuth, a first elevation and a first distance, and wherein the second position indicates a second azimuth, a second elevation and a second distance.

8. The apparatus according to claim 1,
wherein the object metadata processor is configured to receive the metadata, comprising the indication on whether the audio object is screen-related as a first indication, and further comprising a second indication if the audio object is screen-related, said second indication indicating whether the audio object is an on-screen object, and
wherein the object metadata processor is configured to calculate the second position of the audio object depending on the first position of the audio object and depending on the size of the screen, such that the second position takes a first value on a screen area of the screen if the second indication indicates that the audio object is an on-screen object.

9. The apparatus according to claim 8, wherein the object metadata processor is configured to calculate the second position of the audio object depending on the first position of the audio object and depending on the size of the screen, such that the second position takes a second value, which is either on the screen area or not on the screen area if the second indication indicates that the audio object is not an on-screen object.

10. The apparatus according to claim 1,
wherein the object metadata processor is configured to receive the metadata, comprising the indication on whether the audio object is screen-related as a first indication, and further comprising a second indication if the audio object is screen-related, said second indication indicating whether the audio object is an on-screen object,
wherein the object metadata processor is configured to calculate the second position of the audio object depending on the first position of the audio object, depending on the size of the screen, and depending on a first mapping curve as the mapping curve if the second indication indicates that the audio object is an on-screen object, wherein the first mapping curve defines a mapping of original object positions in a first value interval to remapped object positions in a second value interval, and
wherein the object metadata processor is configured to calculate the second position of the audio object depending on the first position of the audio object, depending on the size of the screen, and depending on a second mapping curve as the mapping curve if the second indication indicates that the audio object is not an on-screen object, wherein the second mapping curve defines a mapping of original object positions in the first value interval to remapped object positions in a third value interval, and wherein said second value interval is comprised by the third value interval, and wherein said second value interval is smaller than said third value interval.

11. The apparatus according to claim 10,
wherein each of the first value interval and the second value interval and the third value interval is a value interval of azimuth angles, or
wherein each of the first value interval and the second value interval and the third value interval is a value interval of elevation angles.

12. The apparatus according to claim 1,
wherein the object metadata processor is configured to calculate the second position of the audio object depending on at least one of a first linear mapping function and a second linear mapping function,
wherein the first linear mapping function is defined to map a first azimuth value to a second azimuth value,
wherein the second linear mapping function is defined to map a first elevation value to a second elevation value,
wherein $\varphi_{left}^{nominal}$ indicates a left azimuth screen edge reference,
wherein $\varphi_{right}^{nominal}$ indicates a right azimuth screen edge reference,
wherein $\theta_{top}^{nominal}$ indicates a top elevation screen edge reference,
wherein $\theta_{bottom}^{nominal}$ indicates a bottom elevation screen edge reference,
wherein $\varphi_{left}^{repro}$ indicates a left azimuth screen edge of the screen,
wherein $\varphi_{right}^{repro}$ indicates a right azimuth screen edge of the screen,
wherein $\theta_{top}^{repro}$ indicates a top elevation screen edge of the screen,
wherein $\theta_{bottom}^{repro}$ indicates a bottom elevation screen edge of the screen,
wherein $\varphi$ indicates the first azimuth value,
wherein $\varphi'$ indicates the second azimuth value,
wherein $\theta$ indicates the first elevation value,
wherein $\theta'$ indicates the second elevation value,
wherein the second azimuth value $\varphi'$ results from a first mapping of the first azimuth value $\varphi$ according to the first linear mapping function according to $$\varphi' = \begin{cases} \dfrac{\varphi_{right}^{repro} + 180°}{\varphi_{right}^{nominal} + 180°} \cdot (\varphi + 180°) - 180° & \text{for } -180° \leq \varphi < \varphi_{right}^{nominal} \\ \dfrac{\varphi_{left}^{repro} - \varphi_{right}^{repro}}{\varphi_{left}^{nominal} - \varphi_{right}^{nominal}} \cdot (\varphi - \varphi_{right}^{nominal}) + \varphi_{right}^{repro} & \text{for } \varphi_{right}^{nominal} \leq \varphi < \varphi_{left}^{nominal} \\ \dfrac{180° - \varphi_{left}^{repro}}{180° - \varphi_{left}^{nominal}} \cdot (\varphi - \varphi_{left}^{nominal}) + \varphi_{left}^{repro} & \text{for } \varphi_{left}^{nominal} \leq \varphi < 180° \end{cases}$$

and wherein the second elevation value $\theta'$ results from a second mapping of the first elevation value $\theta$ according to the second linear mapping function according to $$\theta' = \begin{cases} \dfrac{\theta_{bottom}^{repro} + 90°}{\theta_{bottom}^{nominal} + 90°} \cdot (\theta + 90°) - 90° & \text{for } -90° \leq \theta < \theta_{bottom}^{nominal} \\ \dfrac{\theta_{top}^{repro} - \theta_{bottom}^{repro}}{\theta_{top}^{nominal} - \theta_{bottom}^{nominal}} \cdot (\theta - \theta_{bottom}^{nominal}) + \theta_{bottom}^{repro} & \text{for } \theta_{bottom}^{nominal} \leq \theta < \theta_{top}^{nominal} \\ \dfrac{90° - \theta_{top}^{repro}}{90° - \theta_{top}^{nominal}} \cdot (\theta - \theta_{top}^{nominal}) + \theta_{top}^{repro} & \text{for } \theta_{top}^{nominal} \leq \theta < 90° \end{cases}.$$

13. A decoder device comprising:

a USAC decoder for decoding a bitstream to acquire one or more audio input channels, to acquire one or more input audio objects, to acquire compressed object metadata and to acquire one or more SAOC transport channels, an SAOC decoder for decoding the one or more SAOC transport channels to acquire a first group of one or more rendered audio objects, an apparatus for generating loudspeaker signals, comprising:

an object metadata processor, and an object renderer, wherein the object renderer is configured to receive an audio object, wherein the object metadata processor is configured to receive metadata, comprising an indication on whether the audio object is screen-related, and further comprising a first position of the audio object, wherein the object metadata processor is configured to calculate a second position of the audio object depending on the first position of the audio object and depending on a size of a screen if the audio object is indicated in the metadata as being screen-related, wherein the object renderer is configured to generate the loudspeaker signals depending on the audio object and depending on position information, wherein the object metadata processor is configured to feed the first position of the audio object as the position information into the object renderer if the audio object is indicated in the metadata as being not screen-related, and wherein the object metadata processor is configured to feed the second position of the audio object as the position information into the object renderer if the audio object is indicated in the metadata as being screen-related, wherein said apparatus comprises an object metadata decoder, being the object metadata processor of said apparatus, and being implemented for decoding the compressed object metadata to acquire uncompressed metadata, and the object renderer of said apparatus, for rendering the one or more input audio objects depending on the uncompressed metadata to acquire a second group of one or more rendered audio objects, a format converter for converting the one or more audio input channels to acquire one or more converted channels, and a mixer for mixing the one or more audio objects of the first group of one or more rendered audio objects, the one or more audio objects of the second group of one or more rendered audio objects and the one or more converted channels to acquire one or more decoded audio channels.

14. A method for generating loudspeaker signals, comprising:

receiving an audio object, receiving metadata, comprising an indication on whether the audio object is screen-related, and further comprising a first position of the audio object, calculating a second position of the audio object depending on the first position of the audio object and depending on a size of a screen if the audio object is indicated in the metadata as being screen-related, generating the loudspeaker signals depending on the audio object and depending on position information, wherein the position information is the first position of the audio object if the audio object is indicated in the metadata as being not screen-related, and wherein the position information is the second position of the audio object if the audio object is indicated in the metadata as being screen-related.

15. A non-transitory digital storage medium having a computer program stored thereon to perform the method for generating loudspeaker signals, said method comprising:

receiving an audio object, receiving metadata, comprising an indication on whether the audio object is screen-related, and further comprising a first position of the audio object, calculating a second position of the audio object depending on the first position of the audio object and depending on a size of a screen if the audio object is indicated in the metadata as being screen-related, generating the loudspeaker signals depending on the audio object and depending on position information, wherein the position information is the first position of the audio object if the audio object is indicated in the metadata as being not screen-related, and wherein the position information is the second position of the audio object if the audio object is indicated in the metadata as being screen-related, when said computer program is run by a computer.

\* \* \* \* \*